United States Patent
Hever et al.

(10) Patent No.: US 11,301,981 B2
(45) Date of Patent: Apr. 12, 2022

(54) SYSTEM OF VEHICLE INSPECTION AND METHOD THEREOF

(71) Applicant: UVEYE LTD., Tel Aviv (IL)

(72) Inventors: Amir Hever, Tel-Aviv (IL); Dvir Paravi, Ginnaton (IL); Ilya Grinshpoun, Ramat-Gan (IL); Ohad Hever, Modiin (IL)

(73) Assignee: UVEYE LTD., Tel Aviv (IL)

( * ) Notice: Subject to any disclaimer, the term of this patent is extended or adjusted under 35 U.S.C. 154(b) by 0 days.

(21) Appl. No.: 17/041,586

(22) PCT Filed: Mar. 26, 2019

(86) PCT No.: PCT/IL2019/050342
§ 371 (c)(1),
(2) Date: Sep. 25, 2020

(87) PCT Pub. No.: WO2019/186545
PCT Pub. Date: Oct. 3, 2019

(65) Prior Publication Data
US 2021/0090242 A1  Mar. 25, 2021

Related U.S. Application Data

(60) Provisional application No. 62/649,594, filed on Mar. 29, 2018.

(51) Int. Cl.
*G06T 7/00* (2017.01)
*G06T 7/215* (2017.01)
(Continued)

(52) U.S. Cl.
CPC .......... *G06T 7/0004* (2013.01); *G06K 9/6232* (2013.01); *G06T 7/215* (2017.01);
(Continued)

(58) Field of Classification Search
CPC ....... G06T 7/0004; G06T 7/215; G06T 7/344; G06T 7/37; G06T 7/596; G06T 2200/08;
(Continued)

(56) References Cited

U.S. PATENT DOCUMENTS

2018/0211373 A1* 7/2018 Stoppa ................. G06K 9/4628
2021/0272359 A1* 9/2021 Michielin ............... G06T 17/20

OTHER PUBLICATIONS

Auclair, et al., A Robust Approach for 3D Cars Reconstruction, SCIA, 2007, pp. 183-192, vol. 4522.
(Continued)

*Primary Examiner* — John B Strege
*Assistant Examiner* — Daniel C Chang
(74) *Attorney, Agent, or Firm* — Browdy and Neimark PLLC

(57) ABSTRACT

There are provided a method of vehicle inspection and a system thereof, the method comprising: obtaining a plurality of sets of images capturing a plurality of segments of surface of a vehicle at a plurality of time points; generating, for each time point, a 3D patch using a set of images capturing a corresponding segment at the time point, giving rise to a plurality of 3D patches; estimating 3D transformation of the plurality of 3D patches based on a relative movement between the imaging devices and the vehicle; and registering the plurality of 3D patches using the estimated 3D transformation thereby giving rise to a composite 3D point cloud of the vehicle. The composite 3D point cloud is usable for reconstructing a 3D mesh and/or 3D model of the vehicle where light reflection, comprised in at least some of the plurality of sets of images, is eliminated therefrom.

27 Claims, 14 Drawing Sheets

(51) Int. Cl.
- G06T 7/593 (2017.01)
- G06T 7/33 (2017.01)
- G06T 7/37 (2017.01)
- H04N 13/243 (2018.01)
- H04N 13/111 (2018.01)
- G06K 9/62 (2006.01)

(52) U.S. Cl.
CPC ............... *G06T 7/344* (2017.01); *G06T 7/37* (2017.01); *G06T 7/596* (2017.01); *H04N 13/111* (2018.05); *H04N 13/243* (2018.05); G06T 2200/08 (2013.01); G06T 2207/10028 (2013.01); G06T 2207/30108 (2013.01); G06T 2207/30252 (2013.01)

(58) Field of Classification Search
CPC . G06T 2207/10028; G06T 2207/30108; G06T 2207/30252; G06T 17/20; G06T 19/20; G06T 2200/24; G06T 2207/30156; G06T 2210/56; G06T 2219/2012; G06T 7/246; G06T 7/579; G06K 9/6232; H04N 13/111; H04N 13/243
See application file for complete search history.

(56) References Cited

OTHER PUBLICATIONS

Kosmopoulos et al., Automated inspection of gaps on the automobile production line through stereo vision and specular reflection, Computers in Industry, 46(1):49-63, (2001).

Fareh et al., An Integrated vision-guided robotic system for rapid vehicle inspection, International Systems Conference Proceedings, pp. 446-451 (2014).

Furukawa et al., Multi-View Stereo: A 1-15 Tutorial, Foundations and Trends In: "Computer Graphics and Vision", 9(4):1-164 (2013).

* cited by examiner

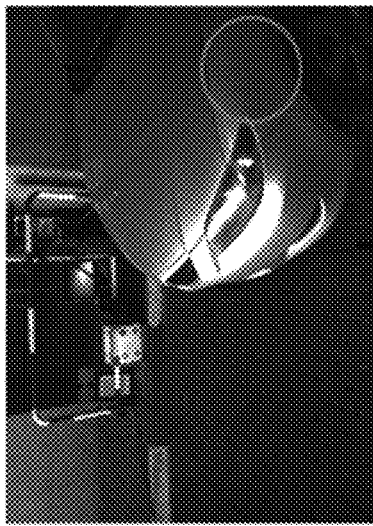
FIG. 8C
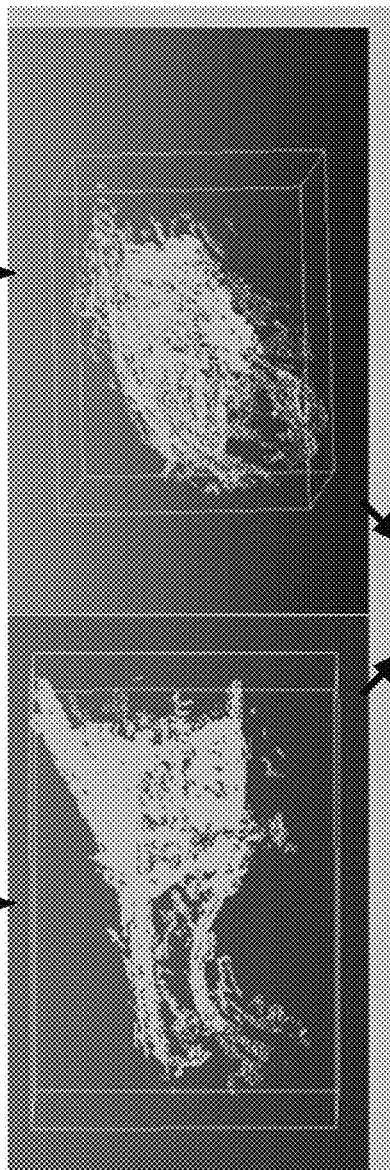
FIG. 8D
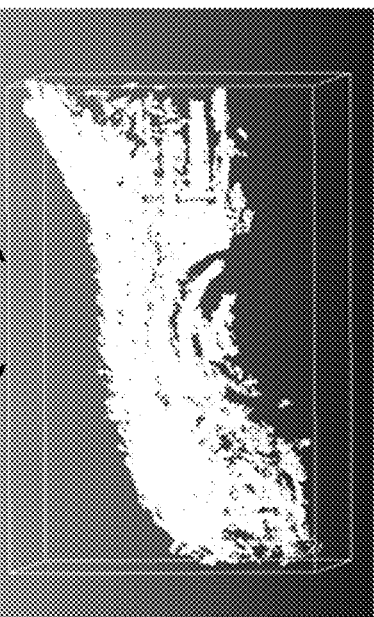
FIG. 8E
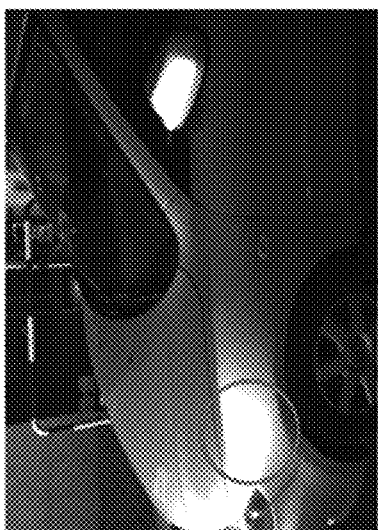
FIG. 8A
FIG. 8B

SYSTEM OF VEHICLE INSPECTION AND METHOD THEREOF

TECHNICAL FIELD

The presently disclosed subject matter relates, in general, to the field of vehicle inspection.

BACKGROUND

Current inspection of vehicles and parts thereof for wear and damages is normally performed manually at an inspection station. This is not only costly and time consuming, but also prone to inspection error and variations caused by specific personnel performing the inspection.

Certain aspects of vehicle inspection have been partially automated with the development of computer technologies. However, current inspection systems mostly work directly on images acquired for the vehicles and can only provide partial and sometimes even inaccurate inspection results due to the limitation of acquired images and the image processing technologies applied thereto. There is thus still a need for an advanced vehicle inspection system which can provide more complete and accurate information regarding the condition of the vehicle.

GENERAL DESCRIPTION

In accordance with certain aspects of the presently disclosed subject matter, there is provided a computerized method of vehicle inspection, the method comprising: obtaining, from a set of imaging devices, a plurality of sets of images capturing a plurality of segments of surface of a vehicle, wherein the set of imaging devices are positioned on at least one side of an inspection passage that the vehicle passes by and are orientated to cover a Field of View (FOV) corresponding to a predetermined region, and the plurality of sets of images are captured at a plurality of time points during a relative movement between the vehicle and the set of imaging devices, such that: i) each set of images captures a respective segment that falls within the predetermined region at a respective time point, and ii) the plurality of segments captured in the plurality of sets of images are partially overlapped in such a way that each given surface point of at least some of the plurality of segments is captured at least at two time points in at least two sets of images, the given surface point captured in the at least two sets of images are as if captured under different illumination conditions pertaining to different relative positions between the given surface point and the set of imaging devices at the two time points; generating, for each given time point, a 3D patch using a set of images capturing a corresponding segment at the given time point, the 3D patch comprising a point cloud of 3D points representative of corresponding surface points in the corresponding segment, giving rise to a plurality of 3D patches corresponding to the plurality of time points and the plurality of segments; estimating 3D transformation of the plurality of 3D patches based on the relative movement between the set of imaging devices and the vehicle at the plurality of time points; and registering the plurality of 3D patches using the estimated 3D transformation thereby giving rise to a composite 3D point cloud of the vehicle, wherein the composite 3D point cloud is usable for reconstructing a 3D mesh and/or 3D model of the vehicle where light reflection, comprised in at least some of the plurality of sets of images, is eliminated therefrom, the 3D mesh and/or 3D model being usable for vehicle inspection.

In addition to the above features, the method according to this aspect of the presently disclosed subject matter can comprise one or more of features (i) to (ix) listed below, in any desired combination or permutation which is technically possible:

(i). At the respective time point, each surface point of the respective segment can be captured by at least two imaging devices of the set of imaging devices.

(ii). The generating can comprise: extracting features characterizing the vehicle from each image of the set of im (iii). ages; performing feature correlation matching between features extracted from different images in the set to obtain matched features; and triangulating the matched features to obtain 3D points representative of the matched features, the 3D points constituting a 3D patch.

(iv). The method further comprises filtering outliers from the 3D patch based on one or more of the following filtering mechanisms: boundary of the predetermined region, depth smoothing algorithm, connected component analysis, and foreground and background classification.

(v). The estimating can comprise: extracting features characterizing the vehicle from each of the plurality of sets of images; estimating a local 3D transformation between each selected pair of two sets of images covering an overlapped part that are overlapped and captured at two corresponding time points, wherein the estimating is performed based on tracking mutual features selected from the extracted features; and aggregating the local 3D transformation to 3D transformation during the plurality of time points.

(vi). The estimating a local 3D transformation can comprise, for each selected pair of two sets of images covering an overlapped part that are overlapped and captured at two corresponding time points: performing feature correlation matching between features extracted from different images within each set of the two sets of images and between corresponding images from the two sets to obtain respective sets of matched features; selecting mutual features among the respective sets of matched features; triangulating the mutual features within each set of images, giving rise to a pair of 3D feature sets representing the mutual features in the two sets of images; and estimating a local 3D transformation between the two sets of images by tracking movement between the pair of 3D feature sets.

(vii). The method can further comprise generating a 3D mesh representative of the surface of the vehicle based on the composite 3D point cloud, the 3D mesh generated by fitting a local surface for each group of neighboring points in the composite 3D point cloud.

(viii). The method can further comprise filtering the composite 3D point cloud using a surface function, wherein the 3D mesh is generated based on the filtered composite 3D point cloud.

(ix). The method can further comprise estimating virtual positions of the set of imaging devices at the plurality of time points based on the 3D transformation, the virtual positions representative of adjusted positions of the imaging devices in accordance with the relative movement at the plurality of time points; and projecting color information of the vehicle on the 3D mesh, the color information determined based on the plurality of sets of images and the virtual positions of the set of imaging devices, giving rise to a 3D model of the vehicle.

(x). The method can further comprise rendering one or more virtual views of the vehicle using the 3D model of the vehicle, wherein the 3D mesh and/or the 3D model and/or the one or more virtual views are usable for identifying anomalies on the surface of the vehicle.

In accordance with other aspects of the presently disclosed subject matter, there is provided a computerized vehicle inspection system, the system comprising a processor and memory circuitry (PMC) configured to: obtain, from a set of imaging devices, a plurality of sets of images capturing a plurality of segments of surface of a vehicle, wherein the set of imaging devices are positioned on at least one side of an inspection passage that the vehicle passes by and are orientated to cover a Field of View (FOV) corresponding to a predetermined region, and the plurality of sets of images are captured at a plurality of time points during a relative movement between the vehicle and the set of imaging devices, such that: i) each set of images captures a respective segment that falls within the predetermined region at a respective time point, and ii) the plurality of segments captured in the plurality of sets of images are partially overlapped in such a way that each given surface point of at least some of the plurality of segments is captured at least at two time points in at least two sets of images, the given surface point captured in the at least two sets of images are as if captured under different illumination conditions pertaining to different relative positions between the given surface point and the set of imaging devices at the two time points; generate, for each given time point, a 3D patch using a set of images capturing a corresponding segment at the given time point, the 3D patch comprising a point cloud of 3D points representative of corresponding surface points in the corresponding segment, giving rise to a plurality of 3D patches corresponding to the plurality of time points and the plurality of segments; estimate 3D transformation of the plurality of 3D patches based on the relative movement between the set of imaging devices and the vehicle at the plurality of time points; and register the plurality of 3D patches using the estimated 3D transformation thereby giving rise to a composite 3D point cloud of the vehicle, wherein the composite 3D point cloud is usable for reconstructing a 3D mesh and/or 3D model of the vehicle where light reflection, comprised in at least some of the plurality of sets of images, is eliminated therefrom, the 3D mesh and/or 3D model being usable for vehicle inspection.

This aspect of the disclosed subject matter can comprise one or more of features (i) to (ix) listed above with respect to the method, mutatis mutandis, in any desired combination or permutation which is technically possible.

Additionally or alternatively, this aspect can comprise one or more of the following features (x) to (xix) listed below in any desired combination or permutation which is technically possible:

(xi). The system can further comprise the set of imaging devices which are attached to a supporting structure comprising at least one pole positioned on the at least one side of an inspection passage.

(xii). The system can further comprise a supporting structure. The set of imaging devices can be attached to the supporting structure at different heights and may be orientated in such a way that at a respective time point, each surface point of the respective segment can be captured by at least two imaging devices of the set of imaging devices.

(xiii). An angle between two neighboring imaging devices and the vehicle can be less than 60 degrees.

(xiv). The predetermined region can be determined according to vehicle dimensions.

(xv). The number of imaging devices in the set can be determined according to a predetermined accuracy requirement.

(xvi). Multiple sets of imaging devices can be attached to the supporting structure, each set faces a respective direction, and the number of sets of imaging devices and/or the number of imaging devices in each set can be determined according to a predetermined accuracy requirement.

(xvii). The system can further comprise an undercarriage inspection unit embedded underground of the inspection passage and configured to capture one or more images of the undercarriage of the vehicle when the vehicle passes by.

(xviii). The system can further comprise one or more illumination units positioned on the at least one side of the inspection passage for providing illumination covering the predetermined region.

(xix). The vehicle can be a moving vehicle and the supporting structure can be mounted on the ground so that the vehicle moves on the inspection passage relative to the supporting structure.

(xx). The vehicle can be a static vehicle wherein the supporting structure can be mounted on a movable platform so as to move relative to the vehicle.

In accordance with other aspects of the presently disclosed subject matter, there is provided a non-transitory computer readable storage medium tangibly embodying a program of instructions that, when executed by a computer, cause the computer to perform a method of vehicle inspection, the method comprising: obtaining, from a set of imaging devices, a plurality of sets of images capturing a plurality of segments of surface of a vehicle, wherein the set of imaging devices are positioned on at least one side of an inspection passage that the vehicle passes by and are orientated to cover a Field of View (FOV) corresponding to a predetermined region, and the plurality of sets of images are captured at a plurality of time points during a relative movement between the vehicle and the set of imaging devices, such that: i) each set of images captures a respective segment that falls within the predetermined region at a respective time point, and ii) the plurality of segments captured in the plurality of sets of images are partially overlapped in such a way that each given surface point of at least some of the plurality of segments is captured at least at two time points in at least two sets of images, the given surface point captured in the at least two sets of images are as if captured under different illumination conditions pertaining to different relative positions between the given surface point and the set of imaging devices at the two time points; generating, for each given time point, a 3D patch using a set of images capturing a corresponding segment at the given time point, the 3D patch comprising a point cloud of 3D points representative of corresponding surface points in the corresponding segment, giving rise to a plurality of 3D patches corresponding to the plurality of time points and the plurality of segments; estimating 3D transformation of the plurality of 3D patches based on the relative movement between the set of imaging devices and the vehicle at the plurality of time points; and registering the plurality of 3D patches using the estimated 3D transformation thereby giving rise to a composite 3D point cloud of the vehicle, wherein the composite 3D point cloud is usable for reconstructing a 3D mesh and/or 3D model of the vehicle where light reflection, comprised in at least some of the plurality of sets of images, is eliminated therefrom, the 3D mesh and/or 3D model being usable for vehicle inspection.

This aspect of the disclosed subject matter can comprise one or more of features (i) to (ix) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 8A-E illustrate an example of reflection removal in accordance with certain embodiments of the presently disclosed subject matter;

DETAILED DESCRIPTION OF EMBODIMENTS

Figure 1A:
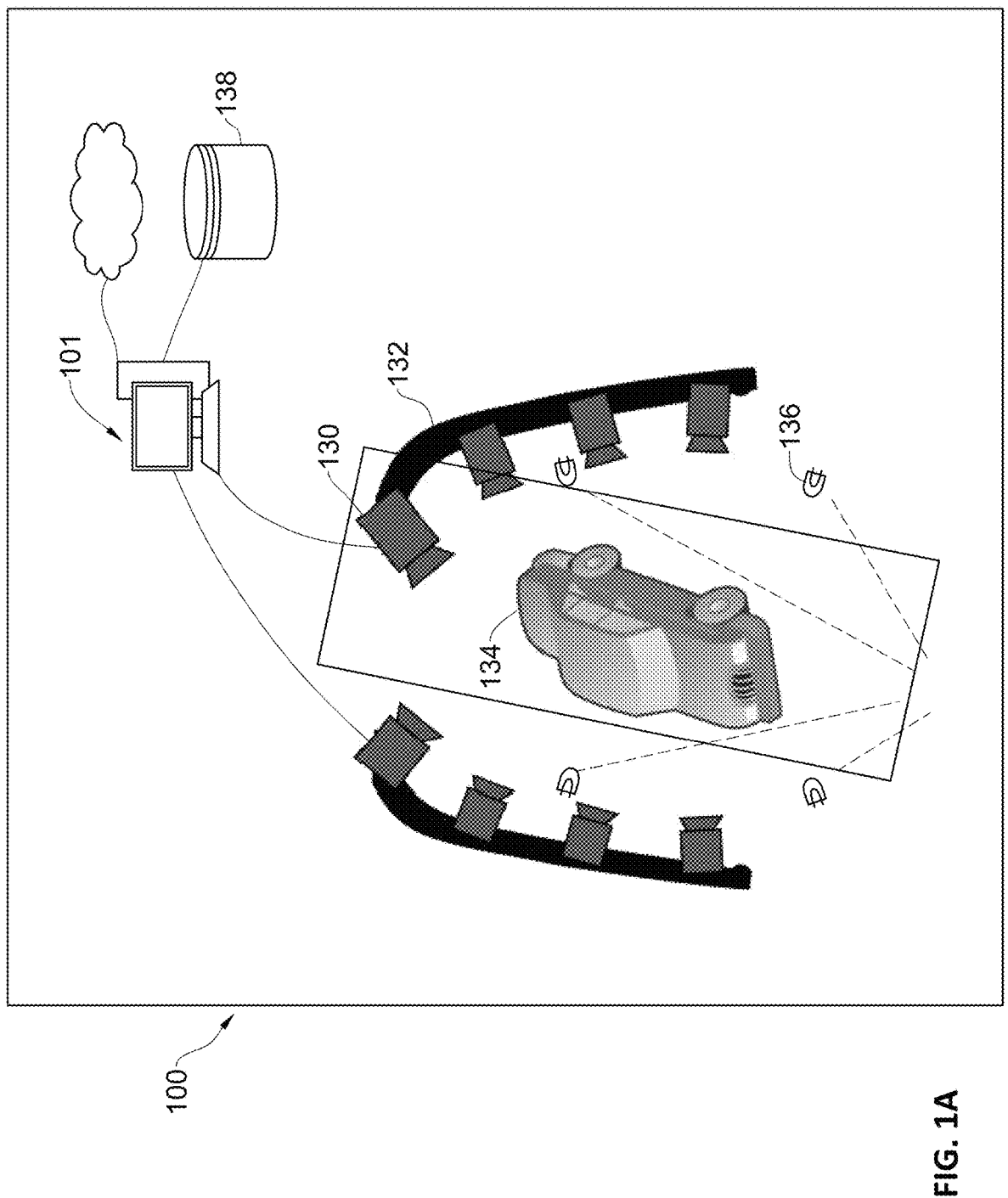
FIG. 1A schematically illustrates a functional block diagram of a vehicle inspection system in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "capturing", "generating". "estimating", "registering", "extracting", "performing", "triangulating", "filtering", "aggregating", "inspecting", "selecting". "projecting", "fitting", "rendering", "identifying", "using", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the vehicle inspection system and parts thereof disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter one or more stages illustrated in the figures may be executed in a different order and/or one or more groups of stages may be executed simultaneously and vice versa.

Bearing this in mind, attention is drawn to FIG. 1A, schematically illustrating a functional block diagram of a vehicle inspection system in accordance with certain embodiments of the presently disclosed subject matter.

The system 100 illustrated in FIG. 1A is a computer-based vehicle inspection system for automatically inspecting a vehicle. System 100 comprises a computerized system 101 for 3D vehicle model reconstruction and vehicle inspection, and a set of image acquisition devices 130 (also termed herein as imaging devices). System 101 can be configured to obtain, from the set of imaging devices 130, a plurality of sets of images capturing/acquiring a plurality of segments of surface of a vehicle. The set of imaging devices 130 can be operatively connected to system 101 and the captured images can be transmitted to system 101 via wired or wireless communication.

The imaging acquisition devices used herein can refer to any kind of imaging devices or general-purpose devices equipped with image acquisition functionalities that can be used to capture vehicle images at a certain resolution and frequency, such as, e.g., a digital camera with image and/or video recording functionalities. The set of imaging devices 130 can comprise multiple camera devices located (mounted or otherwise situated) on at least one side of a vehicle 134 (e.g., on at least one side of an inspection passage/lane that the vehicle 134 passes by) and may be configured to capture a plurality of segments of surface of a vehicle. In some embodiments, there are camera devices located on both sides of the vehicle such that images of both sides of the vehicle can be simultaneously acquired and processed. In some cases, the vehicle 134 can be a moving vehicle which passes through an inspection passage equipped with such imaging devices. In some other cases, the vehicle 134 can be a static vehicle where the set of imaging devices is mounted on a movable platform so as to move relative to the vehicle.

It is to be appreciated that the present disclosure is not limited by the specific number, type, coverage, and perspective of the imaging devices and/or the images as being taken, nor by the specific generation methods of the images by the imaging devices.

Figure 4:
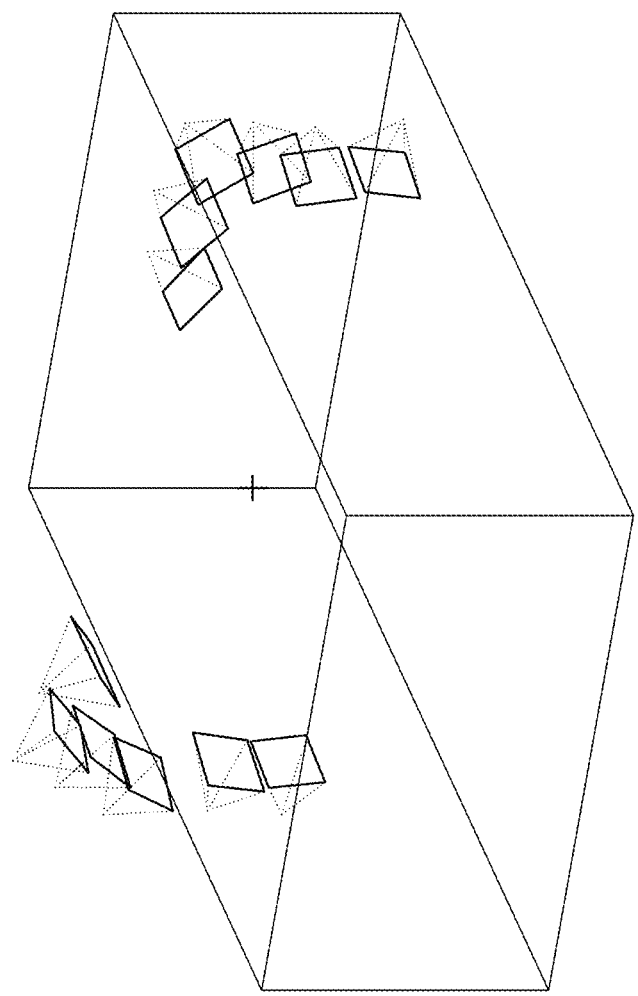
FIG. 4 illustrates a 3D representation of a 3D bounding box and a representation of the imaging devices in 3D virtual coordinates in accordance with certain embodiments of the presently disclosed subject matter.

In some embodiments, system 100 can also comprise a supporting structure 132. The supporting structure 132 can comprise at least one pole positioned on at least one side of the inspection passage. FIG. 1A illustrates an exemplary supporting structure that comprises two poles each positioned on one side of the inspection passage. Each pole has a set of imaging devices attachable thereto. The imaging devices can be attached at an appropriate height and/or angle in relation to the vehicle so as to capture images covering a Field of View (FOV) corresponding to a predetermined region (i.e., a working area for vehicle model reconstruction), as will be described in further detail with reference to FIGS. 2A, 2B and 4.

The plurality of sets of images, as acquired by the set of imaging devices, are acquired at a plurality of time points during a relative movement between the vehicle and the set of imaging devices, such that: i) each set of images captures a respective segment that falls within the predetermined region at a respective time point, and ii) the plurality of segments captured in the plurality of sets of images are partially overlapped in such a way that each given surface point of at least some of the segments is captured at least at two time points in at least two sets of images. The given surface point captured in the at least two sets of images are as if captured under different illumination conditions pertaining to different relative positions between the given surface point and the set of imaging devices at the two time points. Details of the imaging device arrangement are described below with reference to FIGS. 2A and 2B.

In some embodiments, there can be provided one or more illumination devices 136 located in close proximity to the imaging devices and which provide illumination covering the FOVs of the imaging devices so as to enable images to be captured at high resolution and quality. By way of example, the illumination devices 136 can be positioned on the side of the passage, e.g., beside the poles, to provide peripheral illumination for image acquisition, as described below in further detail with reference to FIG. 3. Optionally, the image acquisition and/or the illumination can be triggered by an external sensing device which can detect the presence/approach of a vehicle (such as, e.g., road loop, IR beam, VMD, etc.).

The imaging devices 130 (and the illumination devices, if any) can be controlled by system 101. System 101 is operatively connected to the set of imaging devices (and the illumination devices, if any) and can be used for controlling the devices (e.g., synchronizing the image acquisition and illumination operation), calibrating the system during a set-up stage and processing the acquired images of the vehicle so as to generate a 3D vehicle model in runtime.

Figure 1B:
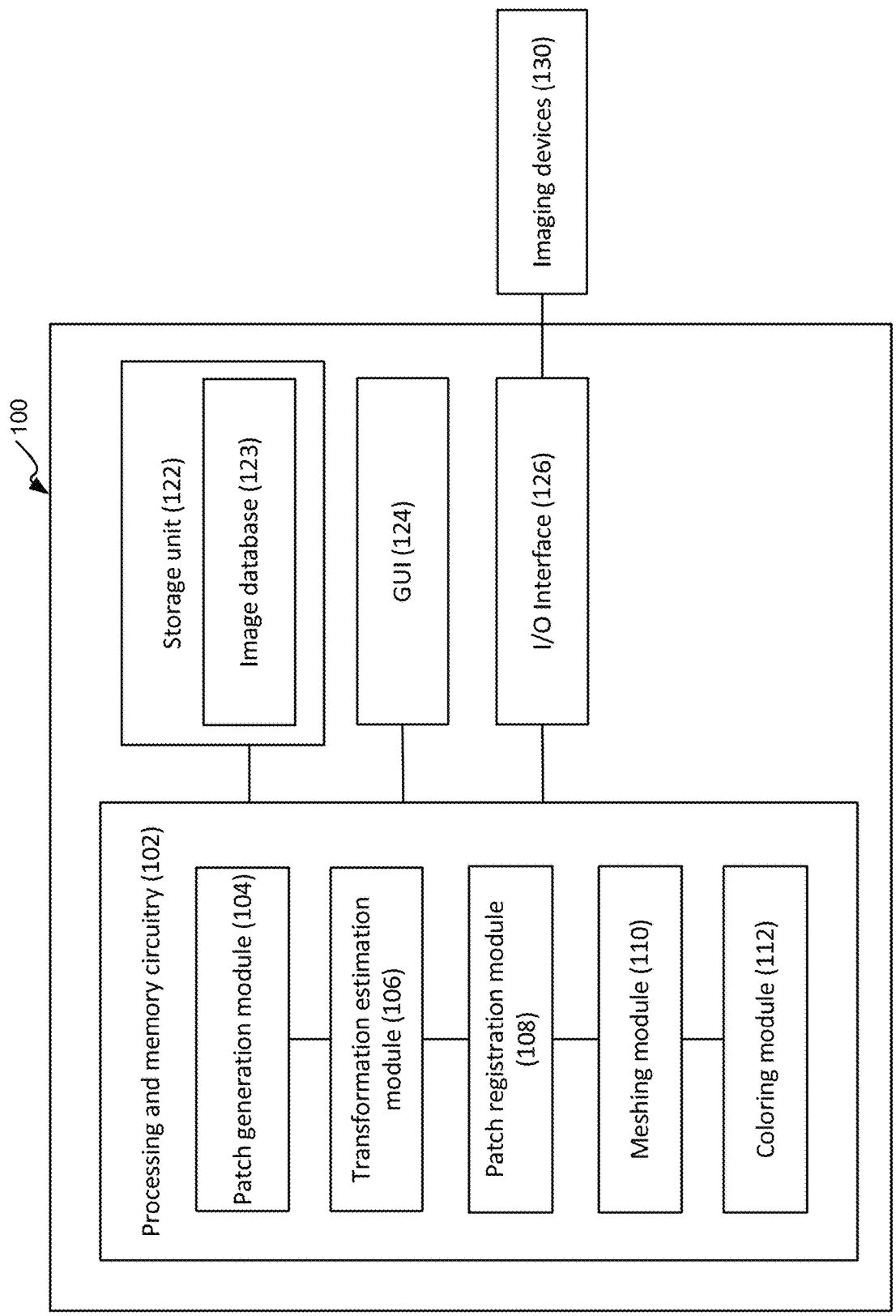
FIG. 1B schematically illustrates a block diagram of a computerized system capable of 3D vehicle model reconstruction and vehicle inspection in accordance with certain embodiments of the presently disclosed subject matter.

Referring now to FIG. 1B, there is schematically illustrated a block diagram of a computerized system capable of 3D vehicle model reconstruction and vehicle inspection in accordance with certain embodiments of the presently disclosed subject matter.

System 101 can comprise a processing and memory circuitry (PMC) 102 operatively connected to a hardware-based I/O interface 126 and a storage unit 122. PMC 102 is configured to provide all processing necessary for operating system 101 which is further detailed with reference to FIGS. 6-7. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein should be expansively construed to cover any processing circuitry with data processing capabilities, and the present disclosure is not limited to the type or platform thereof, or number of processing cores comprised therein. In some cases, system 101 can be operatively connected to one or more external data repositories 138.

According to certain embodiments, functional modules comprised in the PMC 102 can comprise a patch generation module 104, a transformation estimation module 106, and a patch registration module 108. Optionally, the PMC can further comprise a meshing module 110 and a coloring module 112. The functional modules comprised in the PMC can be operatively connected there between. Upon obtaining (e.g., via the hardware-based I/O interface 126), from the set of imaging devices, a plurality of sets of images capturing a plurality of segments of surface of a vehicle, the patch generation module 104 can be configured to generate, for each given time point, a 3D patch using a set of images capturing a corresponding segment at the given time point. The 3D patch can comprise a point cloud of 3D points representative of corresponding surface points in the corresponding segment, giving rise to a plurality of 3D patches corresponding to the plurality of time points and the plurality of segments.

The transformation estimation module 106 can be configured to estimate 3D transformation of the plurality of 3D patches based on the relative movement between the set of imaging devices and the vehicle at the plurality of time points. The patch registration module 108 can be configured to register the plurality of 3D patches using the estimated 3D transformation thereby giving rise to a composite 3D point cloud of the vehicle. The composite 3D point cloud can be usable for reconstructing a 3D mesh and/or 3D model of the vehicle. The reconstructed 3D mesh and/or 3D model can be used for, e.g., vehicle inspection. By using the above described image acquisition and image processing, light reflection comprised in at least some of the plurality of sets of images are eliminated from the reconstructed model.

In some embodiments, optionally, the meshing module 110 can be configured to generating a 3D mesh representative of the surface of the vehicle based on the composite 3D point cloud. The 3D mesh can be generated by fitting a local surface for each group of neighboring points in the composite 3D point cloud. Additionally and optionally, the coloring module 112 can be configured to project color information of the vehicle on the 3D mesh. The color information can be determined based on the plurality of sets of images and virtual positions of the set of imaging devices, giving rise to a 3D model of the vehicle. Details of the image processing by these functional modules are described below with reference to FIGS. 6 and 7.

The storage unit 122 can include an image database 123 which can be configured to store the acquired images of a vehicle. In some cases, these images can be pre-acquired from the imaging devices 130 and stored in the image database 123 to be retrieved and processed by the PMC. The storage unit 122 can also be configured to store any of the intermediate processing results, such as, e.g., the plurality of 3D patches, the estimated 3D transformation, composite 3D point cloud, etc. Optionally, the image database 123 can reside external to system 101, e.g., in one of the external data repositories, or in an external system or provider, and the images can be retrieved via the I/O interface 126.

The I/O interface 126 can be configured to obtain, as input, the plurality of sets of images from the imaging devices and/or the image database, and provide, as output, the composite 3D point cloud, 3D mesh, or 3D model of the vehicle. Optionally, system 100 can further comprise a graphical user interface (GUI) 124 configured to render for display of the input and/or the output to the user. Optionally, the GUI can be configured to enable user-specified inputs for operating system 101.

In some embodiments, the system 101 can further comprise a power manager (not shown separately) configured to supply power to the imaging devices (and illumination devices, if any). By way of example, the power manager can be configured to dim the illumination units at a certain frequency in order to facilitate the acquisition of images and the removal of reflections therefrom.

In some cases, system 101 can be operatively connected to one or more external data repositories 138 which can be local or remote (e.g., cloud-based). The acquired images and/or the results of the run-time image processing can be saved in the storage unit 122 and/or the external data repositories 138.

In some cases, the inspection system 100 can further comprise an undercarriage inspection unit (not shown separately) embedded underground, e.g., between the two poles. The undercarriage inspection unit can comprise one or more imaging devices configured to capture one or more images of the undercarriage of the vehicle when the vehicle passes by.

It is also noted that the system illustrated in FIGS. 1A and/or 1B can be implemented in a distributed computing environment. By way of example, some of the functional modules shown in FIG. 1B can be distributed over several local and/or remote devices, and can be linked through a communication network. By way of another example, system 101 can be located at a different location from the imaging devices.

Those versed in the art will readily appreciate that the teachings of the presently disclosed subject matter are not bound by the systems illustrated in FIGS. 1A and 1B; equivalent and/or modified functionality can be consolidated or divided in another manner and can be implemented in any appropriate combination of software with firmware and hardware. The systems in FIGS. 1A and 1B can be stand-alone network entities, or integrated, fully or partly, with other network entities. Those skilled in the art will also readily appreciate that the data repositories or storage unit therein can be shared with other systems or be provided by other systems, including third party equipment.

Figure 6:
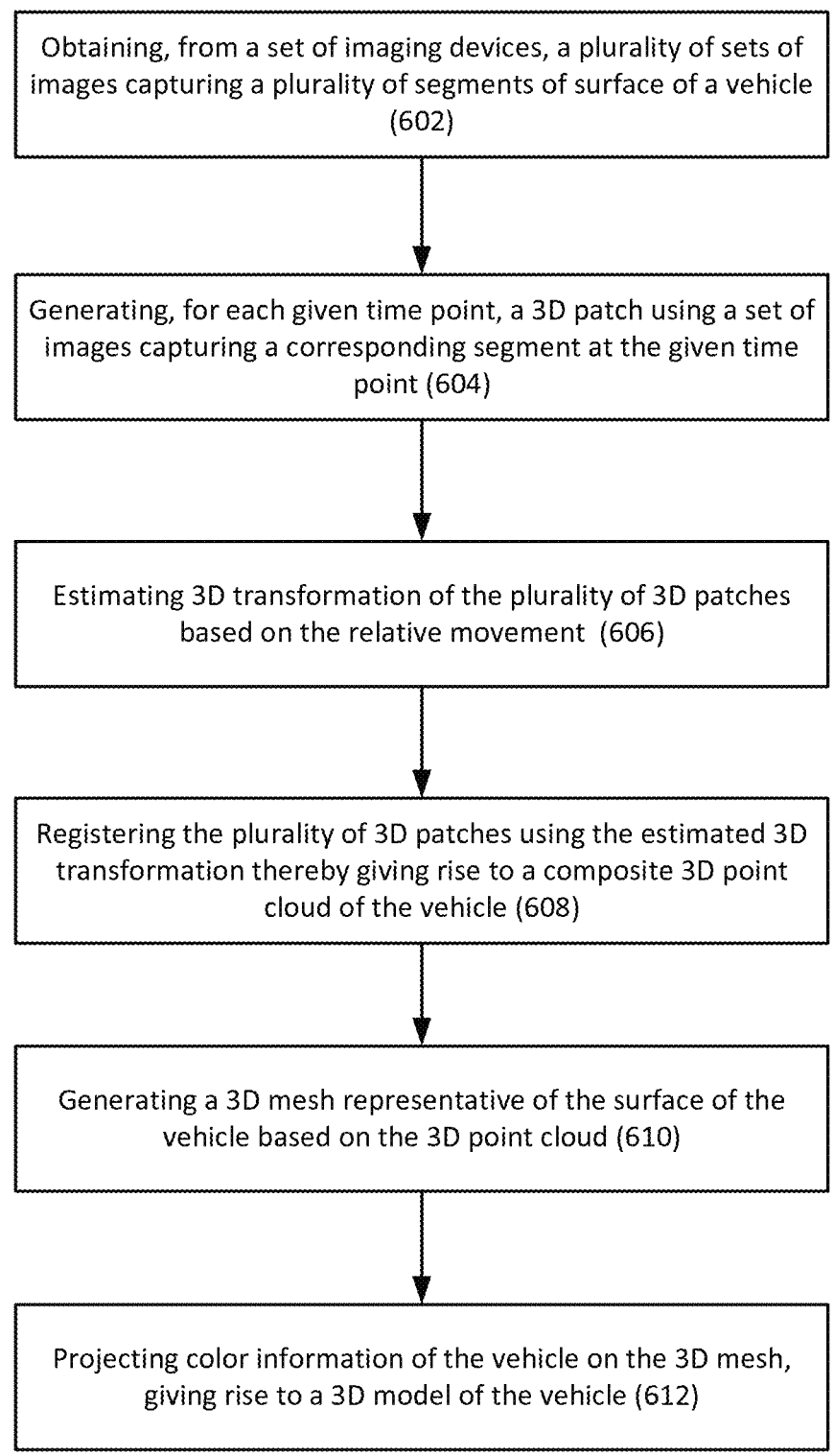
FIG. 6 illustrates schematically a generalized flowchart of 3D vehicle model reconstruction and vehicle inspection in accordance with certain embodiments of the presently disclosed subject matter.
Figure 7:
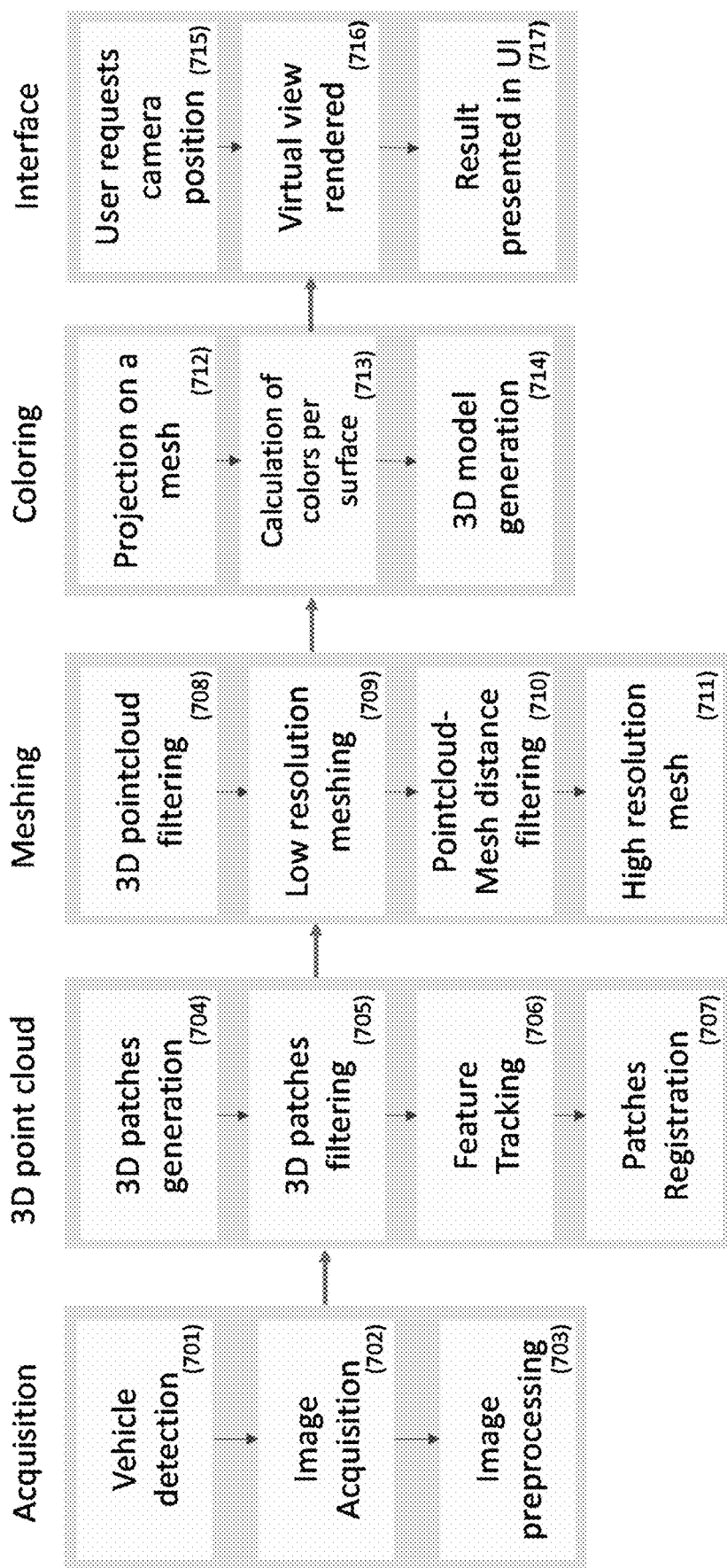
FIG. 7 schematically illustrates an exemplary illustration of detailed processing stages of the 3D vehicle model reconstruction and vehicle inspection system corresponding to FIG. 6 in accordance with certain embodiments of the presently disclosed subject matter.

While not necessarily so, the process of operation of system 101 can correspond to some or all of the stages of the methods described with respect to FIGS. 6 and 7. Likewise, the methods described with respect to FIGS. 6 and 7 and their possible implementations can be implemented by system 101. It is therefore noted that embodiments discussed in relation to the methods described with respect to FIGS. 6 and 7 can also be implemented, mutatis mutandis as various embodiments of the system 101, and vice versa.

Figure 2A:
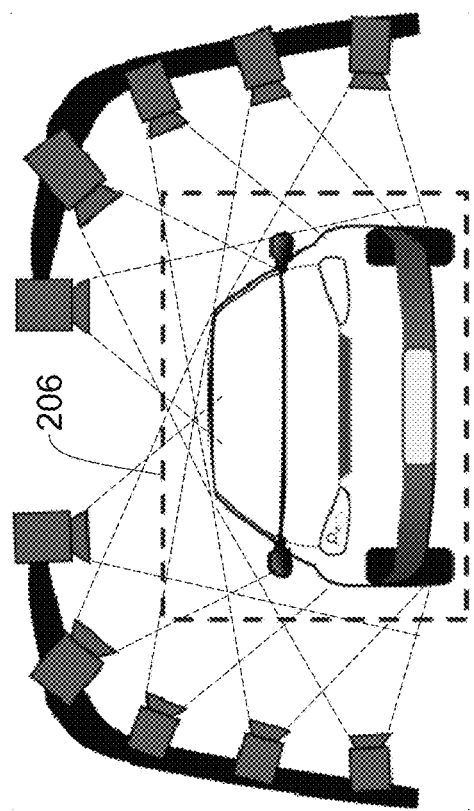
FIGS. 2A and 2B illustrate one example of different perspective views of imaging device arrangement in accordance with certain embodiments of the presently disclosed subject matter.
Figure 2A:
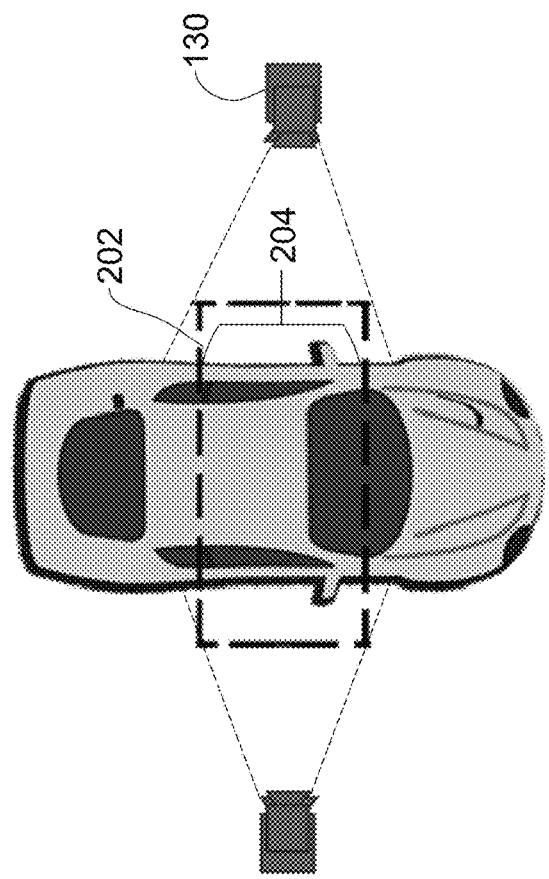
Figure 2B:
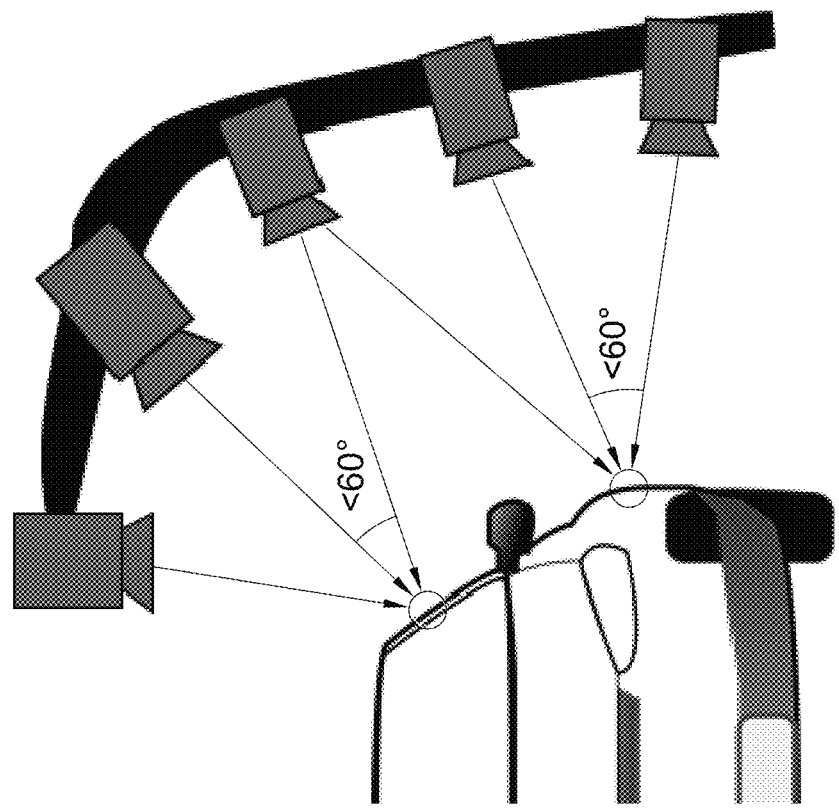

Referring now to FIGS. 2A and 2B, there is illustrated one example of different perspective views of an imaging device arrangement in accordance with certain embodiments of the presently disclosed subject matter.

FIG. 2A shows top view and front view of a set of imaging devices as relative to the vehicle to be inspected. It can be seen from the top view that the set of imaging devices 130 (e.g., attached to the pole) are oriented to cover a Field of View (FOV) corresponding to a predetermined region (the predetermined region is a 3D working area or bounding box and 202 shows the length-width plane of the predetermined region). Since the set of imaging devices keep capturing images at a plurality of time points during a relative movement between the vehicle and the set of imaging devices, each set of images captures a specific segment/part 204 (e.g., a "slice" along the vehicle) that falls within the predetermined region 202 at a given time point. The set of imaging devices are positioned in a manner that the range of the set of images taken at a given time point can overlap and cover the entire height-width plane of the predetermined region (see 206 in front view in FIG. 2A). Specifically, at the given time point, each surface point of the specific segment is captured by at least two imaging devices of the set of imaging devices, so that triangulation can be performed for estimating the position of the point. In some cases, for better noise reduction and error correction purposes, each surface point in the vehicle is captured by at least three imaging devices with each angle between two neighboring imaging devices and the vehicle is less than 60 degrees (as illustrated in side view in FIG. 2B). By way of example, in some cases, the angles can be even 10 or 15 degrees.

The image acquisition is performed so as to have the plurality of segments captured in the plurality of sets of images partially overlapped in such a way that each given surface point of at least some of the plurality of segments is captured at least at two time points in at least two sets of images. In some embodiments, the partial overlapping of the plurality of segments can indicate that a number of neighboring segments of the plurality of segments are overlapped. For instance, the number of neighboring segments that are overlapped can be defined differently and can range from 2 to N (N>2). This may relate to, e.g., the speed of the relative movement between the vehicle and the imaging devices and the capture rate of the imaging devices. By way of example, each two neighboring segments can be overlapped such that an overlapped part between the two segments are captured twice in two sets of images corresponding to the two segments. By way of another example, when the capture rate is higher, it is possible that each five neighboring segments can be overlapped where some surface part can be captured in two sets of images while some other part can be captured in all five sets of images. It is to be noted that for simplicity of description, it is also referred to in some of the embodiments that the images capturing the neighboring segments are overlapped (i.e., the range of the images are overlapped).

It is also to be noted that in the case of N segments being captured, it is possible that in some embodiments the surface points in all N segments are captured at least twice in at least two sets of images, while it is also possible that in some other embodiments, only the surface points in some of the segments are captured twice, due to the limitation of image acquisition. Similarly, it is also possible that only some of the surface points in one segment are captured twice, while others are not. A surface point may refer to a small unit on the vehicle surface that can be captured by the imaging devices and should not be limited by its dimensions. It is appreciated that the present disclosure is not limited by the number of segments overlapped, or the coverage of surface points being captured or the number of times that they are captured.

A given surface point captured in the at least two sets of images are as if captured under different illumination conditions pertaining to different relative positions between the given surface point and the set of imaging devices at the two time points. By way of example, the surface points in an overlapped part are captured in at least two sets of images which during 3D reconstruction are used to register and combine corresponding 3D patches so as to be able to compensate each other and enable the removal of possible light reflection existing in some of the sets.

In some embodiments, multiple sets of imaging devices can be used for capturing images so as to achieve better resolution. By way of example, three sets of imaging devices can be used, each facing a respective direction, e.g., a direction of oncoming travel of the vehicle, a direction towards the vehicle when the vehicle passes the poles, and a direction of outgoing travel of the vehicle.

As shown in the front view and side view, in some cases, upper parts of the poles may bend, e.g., into a curve, and lean towards the center, such that the imaging devices attached on top can face downwards to capture images of the roof of the vehicle. In some embodiments, the supporting structure can further comprise a roof which connects the two poles, and the top imaging devices can be attached to the roof.

According to certain embodiments, the predetermined region is a virtual 3D bounding box that provides the constraint of a working area for which the inspection system can provide sufficient data for 3D reconstruction. Another illustration of the predetermined region is in FIG. 4, which shows a 3D representation of the 3D bounding box, and a representation of the imaging devices in 3D virtual coordinates in accordance with certain embodiments of the presently disclosed subject matter. The 3D bounding box can represent the common FOV between the imaging devices in the set at a given time. In some cases, the predetermined region can be determined according to vehicle dimensions. The predetermined region does not impose any constraint on vehicle length, only on height and width. Therefore, different vehicle types (for example, buses, private cars, trucks, etc.) and dimensions may result in different predetermined region sizes and volumes. For instance, the width and height of the predetermined region can be determined according to width and height of the vehicle that passes by.

Byway of example, to extend the height of the predetermined region, imaging devices can be added along the poles to provide the required overlap constraints along the vehicle's exterior.

By way of another example, to extend the width of the predetermined region, imaging devices can be added on the top of the pole to extend the roof further into the lane, to provide the required overlap constraints along the vehicle's exterior.

In some cases, a parameter of predetermined accuracy requirement (e.g., required 3D model accuracy by the customer) may affect the arrangement of the imaging devices. By way of example, the number of imaging devices in each set can be determined according to the predetermined accuracy requirement. For instance, to achieve better model accuracy, more angles are obtained either by increasing the amount of imaging devices and/or increasing imaging devices' capture rate, therefore resulting in higher overlap in the images. In the case of multiple sets of imaging devices being used each facing a respective direction as aforementioned, the number of sets of imaging devices and/or the number of imaging devices in each set is determined according to a predetermined accuracy requirement.

In some cases, a parameter of vehicle velocity may affect the accuracy, as the faster the vehicle travels, the less acquisition time is available. To support higher velocities, increasing the amount of imaging devices and/or increasing imaging devices' capture rate can be needed.

Figure 3:
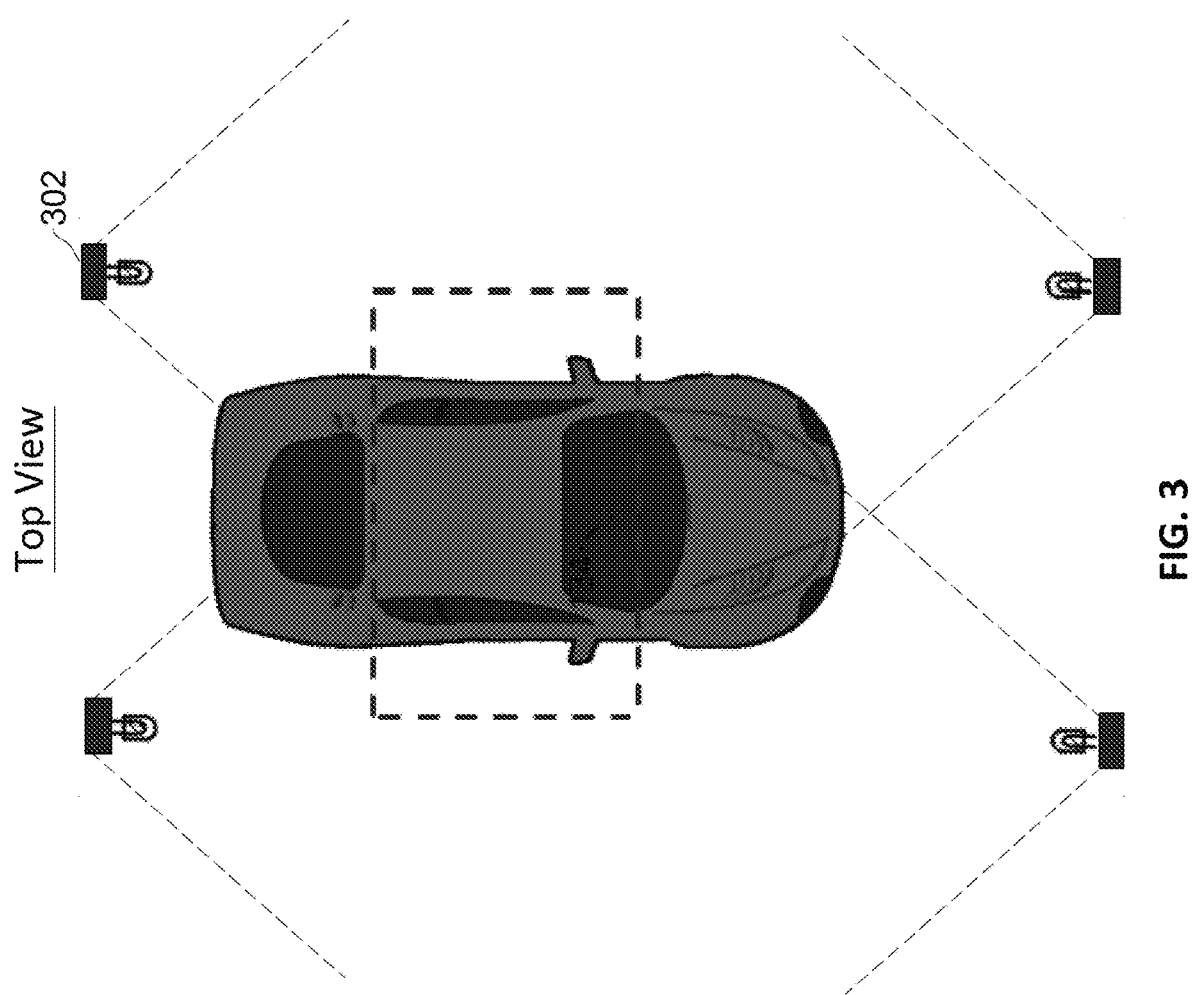
FIG. 3 illustrates atop view of an exemplary illumination device arrangement in accordance with certain embodiments of the presently disclosed subject matter.

FIG. 3 illustrates a top view of an exemplary illumination device arrangement in accordance with certain embodiments of the presently disclosed subject matter. As shown in FIG. 3, four peripheral illumination devices 302 are positioned on the sides of the inspection passage and used for providing light to the vehicle in the predetermined region. The illumination devices aim to provide enough light to be able to capture the vehicle in short exposure times and avoid motion smears in the images.

In some cases, illumination devices can be attached (e.g., installed) along the poles. By way of example, the illumination devices can be positioned between the sets of the imaging devices, or they can be arranged in other positions relative to the imaging devices. The illumination devices can face different angles so as to provide sufficient illumination covering the predetermined region.

Possible reflections resulted from the illumination may appear in different areas on the vehicle. The areas of reflection on the vehicle can depend on, for example, the angle of the illumination device, imaging device and the shape of the vehicle part, etc. It is to be noted that illumination devices are not always necessary and in some cases natural light or environmental illumination can be used instead. In cases of illumination devices being installed, it is preferred not to have the illumination devices directed to the vehicle so as to avoid reflection.

As aforementioned, the inspection system can be used to inspect a moving vehicle or a static vehicle. In cases where the vehicle is a moving vehicle, the imaging devices (or the supporting structure attached thereto) can be mounted on the ground so that the vehicle is moving on the inspection passage relative to the supporting structure. In cases where the vehicle is a static vehicle, the supporting structure is mounted on a movable platform so as to move relative to the vehicle.

With the arrangement of the imaging devices (and illumination devices if any) as described above, the images are captured by the set of imaging devices during a relative movement between the vehicle and the imaging devices such that any point in the surface covered by at least some of the segments is captured by the set of imaging devices at different time points, giving rise to different captured images. These captured images covering the surface point are as if captured under different illumination conditions pertaining to relative positions between the given surface point and the imaging devices at different time points. This enables the inspection system to utilize images captured from different time points to properly reconstruct a 3D model of the vehicle without being affected by possible light reflections. In some cases, the images within one set can also help with removal of light reflection since they are captured from different angles.

Figure 5:
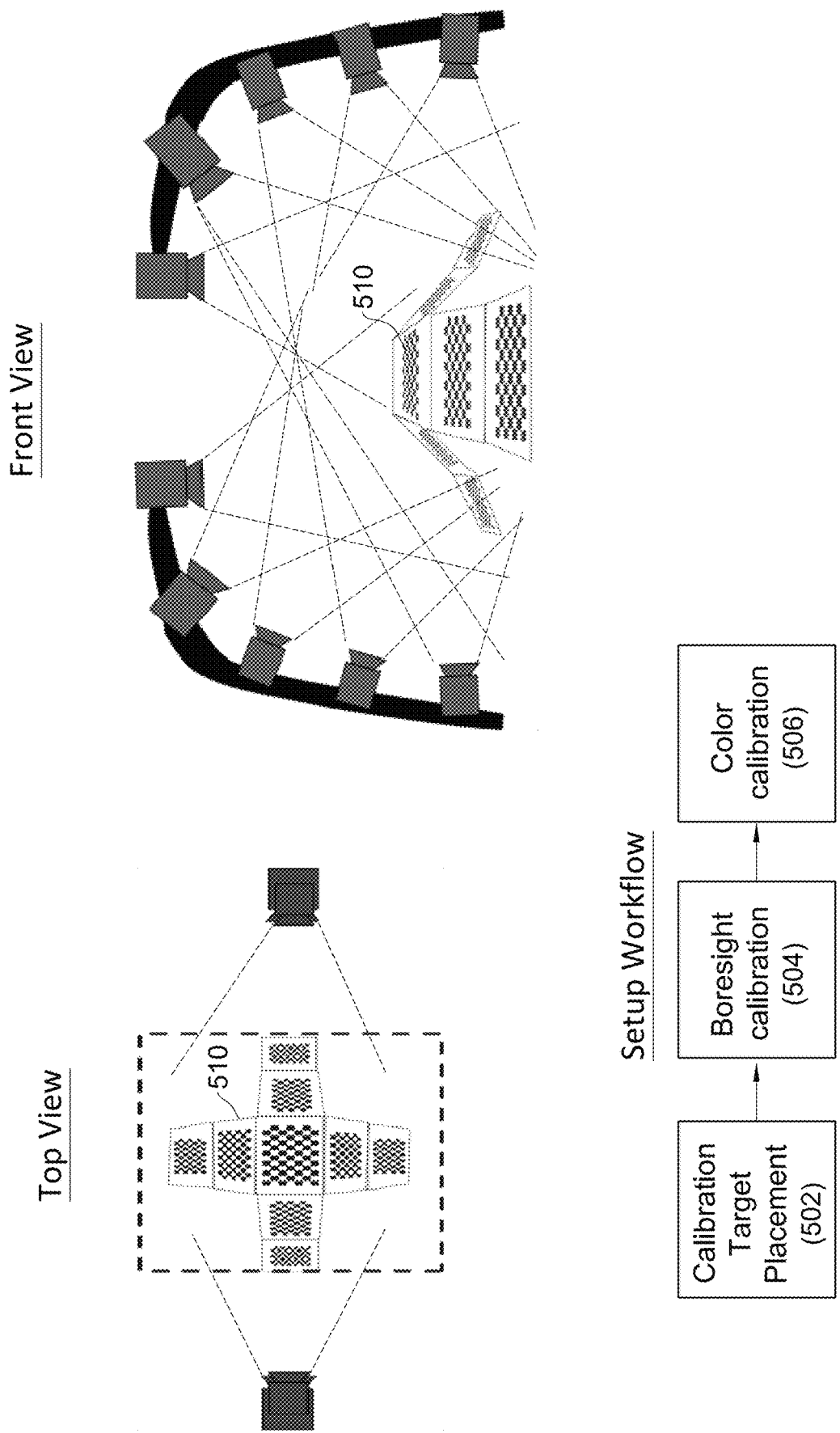
FIG. 5 illustrates schematically a calibration set up stage of the system in accordance with certain embodiments of the presently disclosed subject matter.

Referring now to FIG. 5, there is illustrated schematically a calibration set up stage of the system in accordance with certain embodiments of the presently disclosed subject matter.

After positioning the imaging device (and illumination devices if any), as described above with reference to FIGS. 1-3, calibration procedures can be applied to obtain camera parameter sets in a virtual 3D coordinates system to be used during the run-time processes of the system.

One or more calibration targets 510 can be positioned (502) in the predetermined region as shown in the top view and front view of FIG. 5, while the illumination devices (if any) are operational in positions which allow the imaging devices to capture images. Boresight (geometrical) calibration (504) can be performed. Camera position parameters that define the geometrical relations between the imaging devices and the targets are estimated, and the bounding box position can be derived from the camera positions. The position parameters can be stored in system 101. Color calibration (506) can also be performed. Color correction parameters are calculated to reach the same color balance for each imaging device, and can be stored in the system 101. It is noted that in some cases calibration can be performed in the setup stage. In some other cases there might be no setup stage and alternatively it can be performed during runtime construction.

Referring now to FIG. 6, there is illustrated schematically a generalized flowchart of 3D vehicle model reconstruction and vehicle inspection in accordance with certain embodiments of the presently disclosed subject matter.

A plurality of sets of images can be obtained (602) (e.g., by the I/O interface 126 illustrated in FIG. 1B) from a set of imaging devices. The plurality of sets of images can capture a plurality of segments of surface of a vehicle at a plurality of time points.

As described above with reference to FIGS. 1A and 1B, the set of imaging devices can be positioned on at least one side of an inspection passage that the vehicle passes by and be orientated to cover a Field of View (FOV) corresponding to a predetermined region. The plurality of sets of images are captured at a plurality of time points during a relative movement between the vehicle and the set of imaging devices, such that: i) each set of images captures a respective segment that falls within the predetermined region at a respective time point, and ii) the plurality of segments captured in the plurality of sets of images are partially overlapped in such a way that each given surface point of at least some of the plurality of segments is captured at least at two time points in at least two sets of images. The given surface point captured in the at least two sets of images are as if captured under different illumination conditions pertaining to different relative positions between the given surface point and the set of imaging devices at the two time points. As aforementioned, in some embodiments, the number of neighboring segments that are overlapped can be defined differently, ranging from 2 to N (N>2). However, to enable the intended effect of the system (i.e., for reflection removal), in some embodiments, each part of the vehicle surface (or most parts of the surface) should be captured at least at two time points in at least two sets of images.

The image acquisition stage is further illustrated in FIG. 7 (FIG. 7 shows an exemplary illustration of detailed processing stages of the 3D vehicle model reconstruction and vehicle inspection system corresponding to FIG. 6 in accordance with certain embodiments of the presently disclosed subject matter). Once system 100 is calibrated, the calibrated system can be initiated in run-time when a vehicle approaches. The initiation can be triggered by an external sensing device which can detect (701) the presence of a vehicle (such as, e.g., road loop, IR beam. VMD, etc.).

Upon initiation, the illumination devices (if any) are turned on and the set of imaging devices start acquiring (702) images at a predefined capture rate with color correction parameters as obtained in the calibration set-up stage. The set of imaging devices can be synced to capture images at the same time and the captured images can be stored with metadata of capturing time and image device identifier.

In some embodiments, optionally, the captured images can be pre-processed (703) (e.g., by the imaging devices 130 or by the PMC 102 of system 100 once being transmitted thereto). By way of example, the captured images can be sorted into a plurality of sets of images according to the images' capture time. By way of another example, the pre-processing can include one or more of the following: de-bayering, flat-field correction, color correction, lens distortion correction, and edge enhancement etc. The captured and/or pre-processed images can be further processed for generating 3D patches, as described below with reference to block 604. When the external sensing device detects that the vehicle is out of the detection area (e.g., out of the predetermined region), it can instruct the imaging devices to stop acquiring images.

Referring back to FIG. 6, for each given time point (i.e., a given capture time), a 3D patch can be generated/reconstructed (604) (e.g., by the patch generation module 104) using a set of images capturing a corresponding segment at the given time point. The 3D patch can comprise a point cloud of 3D points representative of 3D location of corresponding surface points of the corresponding segment in the predetermined region (i.e., the virtual bounding box). Thus a plurality of 3D patches can be generated corresponding to the plurality of time points and the plurality of segments. In some cases, more than one patch (e.g., a set of patches) can be created for each given time point covering different parts of the segment.

According to certain embodiments, the inputs for patch generation can include a set of images taken simultaneously by the set of imaging devices at a given time point, together with calibrated camera positions (such as, e.g., focal length, focal center, sensor size, orientation and transformation of each camera relative to others, etc.).

For purpose of illustration, there is now described an exemplary process of generating a 3D patch. First, features characterizing the vehicle can be extracted from each image of the set of images. For instance, in some cases, corner (e.g., crossing of two or more edges) detection algorithm can be used to locate the features. Then, feature matching can be performed between features extracted from different images in the set to obtain matched features, e.g., by using normalized cross-correlation. In some cases, the matched features can be filtered. For instance, a discrepancy function (i.e., a function that describes a motion statistical structural model which preserves structure of features taking into consideration motions of the features) can be used for filtering features which do not fit the model and are thus considered outliers. Once the extracted features are matched (in some cases also filtered), the matched features can be triangulated to obtain 3D points representative of the matched features, the 3D points constituting a 3D patch. Triangulation refers to a process of determining the location of a point by forming triangles to it from known points, e.g., finding an intersection of 3D rays sent from at least two imaging devices to a matched feature. Optionally, each triangulated feature can be expanded to nearest features using photo consistency assumption to create dense 3d reconstruction.

It is to be noted that the 3D patch generation in some cases does not necessarily have to be implemented using the above described imaging device structure and corresponding methodology. Other suitable structures and methodologies can be used in addition or in lieu of the above. By way of example, depth cameras (such as, e.g., stereo cameras, time-of-flight (ToF) cameras, etc.) can be used and a depth map can be created. By way of another example, Lidar (i.e., light detection and ranging) can be used to make digital 3D representations of a target. In some cases, such structures (e.g., depth cameras or Lidar) can be used together with the imaging devices as described above, as long as they are calibrated together with the imaging devices in the setup stage and agree on the same coordinate system. For instance, in such cases, Lidar can be used for 3D patch generation, and the image data from the imaging devices can be used for projection purposes as described below with reference to block 612.

According to certain embodiments, in some cases, outliers representative of noises need to be filtered from the 3D patches (as illustrated in block 705 of FIG. 7).

This is because the 3D reconstruction is a very noisy process and different types of noises can be included in the resulted 3D patches. For exemplary purposes, there are now illustrated below a few filtering mechanisms which can be used separately or in any suitable combination in the presently disclosed subject matter.

By way of example, the 3D patch can be filtered according to the predetermined region (i.e., the bounding box where the 3D patch is expected to be generated and bounded). For instance, the 3D points that fall outside of the bounding box can be filtered from the 3D patch.

A depth map representative of distances between the points in the 3D patch and corresponding imaging devices can be used for filtering outliers. The depth map can be generated by projecting the 3D points back to 2D, obtaining it's 'x' and 'y' coordinates on the image plane and setting the intensity of the point as indicative of the distance of the 3D point from the camera it projected to. By way of another example, certain depth smoothing algorithms can be applied to the depth map in order to smooth out and remove outlier points. This can be based on, e.g., the assumption that neighboring points are alike and outlier points do not satisfy surface continuity.

By way of further example, connected component analysis can be applied to the depth map, and any disconnected components can be filtered too. By way of yet further example, in some cases, the captured images may include a background area which, during the 3D patch generation, can be also reconstructed and may fall within the bounding box. In some cases, due to certain errors in the feature matching process, the reconstructed background may seem to be connected with the vehicle. For filtering this type of outliers, a foreground mask can be generated by applying a threshold on the depth map. The mask can be further refined with certain graph-based algorithms (such as, e.g., Graph-Cut). The refined mask can be used to classify the pixels in the 3D patches and determine for each pixel whether it belongs to the foreground or background distribution. For instance, the 3D patches can be projected on the foreground mask and any 3D points that fall in the foreground belong to the vehicle, rendering the rest of the points to be outliers.

It is to be noted that the 3D patches obtained during the 3D reconstruction step in some cases mostly lack reconstruction of flat surfaces. For instance, the output of this step can be a semi-dense 3D point cloud, comprising mostly, e.g., edges, corners and high contract areas etc. Missing information, such as surface and color information, etc., can be filled in in later steps as will be described below with reference to blocks 610 and 612.

It is also be noted that other 3D reconstruction techniques may be used in addition or in lieu of the above, such as, e.g., techniques that can decompose shading information from the images and estimate normal maps (e.g., maps including orientation of small 3D planes representing each point in the point cloud) which may ease the process of reconstruction of flat low contrast areas, thus may assist in creating a more refined 3D point cloud.

As described above, the output of 3D reconstruction in block 604 are a plurality of 3D patches corresponding to the plurality of segments and the plurality of time points, as the vehicle passes through the inspection system. Due to the change of capture time between the sets of images, at least some of the sets of images are partially overlapped in their range. Thus the 3D patches also overlay on top of each other and the parts/areas in the images with light reflection may result in holes in the patches. This is because the reflection, as a type of noise in the reconstruction process, may be most likely filtered out in the filtering process as described above, thereby preventing the patches to be reconstructed to a full/complete 3D model. Considering that the surface of vehicles is normally flat and smooth thus can be very reflective (e.g., resembling the nature of a mirror), images captured for a vehicle during inspection often include reflections, thus it can be technically very challenging to remove the reflections during reconstruction of the vehicle model. One goal of the present disclosure is to solve this problem by properly estimating transformation and registering the 3D patches, as described below in further detail.

In order to create a complete 3D reconstruction of the vehicle, each 3D patch needs to be placed one next to the other based on the vehicle movement. The plurality of 3D patches (reconstructed from corresponding sets of images captured at different time points) need to be properly registered so as to be able to compensate for the missing information caused by light reflection. According to certain embodiments, a 3D transformation (of the plurality of 3D patches) can be estimated (606) (e.g., by the transformation estimation module 106) based on the relative movement between the set of imaging devices and the vehicle at the plurality of time points. The registration can be performed using the estimated 3D transformation.

Since the movement is relative between the vehicle and the set of imaging devices, in some embodiments, tracking of a moving vehicle can be realized by tracking of moving imaging devices (i.e., as if the set of imaging devices are moving relative to a static vehicle). Thus, a 3D transformation of the structure of the imaging devices (e.g., position and orientation of the set of cameras) in time can be identified (as illustrated in block 706 of FIG. 7), which is equivalent to transformation of the mutual features in the sets of images captured by the set of imaging devices, 3D transformation can refer to rigid transformation when calibration is performed during set-up, or can refer to Affine transformation when calibration is not performed during set-up but only during reconstruction in runtime. Rigid transformation refers to a geometric transformation in a Euclidean space that preserves the Euclidean distance between every pair of points, including rotation and translation. For instance, any proper rigid transformation can be decomposed as a rotation followed by a translation.

There is now illustrated an example of performing the transformation estimation. First, features characterizing the vehicle can be extracted from each of the plurality of sets of images. Similar feature extraction methods as described above, and/or some more complex methods can be used for this purpose. By way of example, certain methods of feature extraction that can determine also the scale and orientation of the features (which may change at different time points due to different perspectives) can be used so as to obtain more information of the extracted features. For instance, one of such methods looks for features such as, e.g., corners in different image scales (e.g., by scaling the images) and also looks at the neighboring pixels of the features and the $2^{nd}$ order gradients in the neighboring area to determine the orientation of the features. The 2D coordinates of the features can be estimated with sub-pixel accuracy by fitting a 2D quadratic function and finding the maximum. In some cases, a binary descriptor can be generated for each feature, using a method that encodes the feature appearance using binary string.

Following the feature extraction, a local 3D transformation can be estimated between each selected pair of two sets of images that are overlapped and captured at two corresponding time points. The estimating can be performed based on tracking mutual features selected from the extracted features. In some cases, the two sets of images selected are captured at two consecutive time points, but this is not necessarily so. For instance, images captured at time t and time t+5 can be selected for estimating local 3D estimation as long as they share an overlapped part. According to certain embodiments, the local transformation for each two sets of images that are overlapped and captured at two corresponding time points can be estimated as follows.

First, feature matching can be performed between features extracted from different images within each set of the two sets of images and between corresponding images from the two sets, so as to obtain respective sets of matched features. By way of example, feature matching can be performed using brute-force matching (e.g., by calculating minimum Hamming distance between features). In some cases, the initial matched features may contain a large percentage of outliers which need to be further filtered. For this purpose, a grid-based motion statistic filtering method that exploits neighboring information of the features to statistically filter outliers can be used. Considering that the extracted features are rigid, pattern, structure and/or order of the features can be identified and used for the filtration. For illustrative and exemplary purposes, three sets of matched features can be generated: match set A including matched features between images captured by different cameras in time t, match set B including matched features between images captured by different cameras in time t+1, and match set C including matched features between corresponding images (i.e., images captured by the same camera) from the two sets at time t and t+1.

Mutual features among the respective sets of matched features can be selected (in the present example, mutual matches of all three sets—A∩B∩C). The mutual features in each image set can be triangulated (e.g., mutual features in A and B can be respectively triangulated to 3D using 2D information from images of different cameras at respective time points and the calibration information), giving rise to a pair of 3D feature sets representing the mutual features in the two sets of images. The pair of 3D feature sets have the same size and represent the same features in different time points. Optionally, the 3D feature sets can be filtered again, for instance, using the bounding box as described above. Due to rigid motion of the features, they can also be filtered by distances. For instance, distances can be calculated between corresponding features which can fit into a spherical cluster. Any feature which lies outside of the spherical cluster can be considered as an outlier, and thus be filtered out. Once the features are matched and filtered, the local rigid transformation between the two sets of images (i.e., between the two time points) can be estimated by tracking movement (e.g., rotation and translation) between the pair of 3D feature sets. By way of example, a rigid transformation matrix can be generated for estimating transformation based on e.g., covariance matrix between features.

Once the local 3D transformation between each selected pair of two sets of images that are overlapped is estimated, all the local transformations can be aggregated to a chain of 3D transformation (also referred to herein as 3D transformation) during the plurality of time points (e.g., from t=0 to t=n). In some cases, further filtration can be applied to the 3D transformation. By way of example, median filtering can be applied to the transformation to remove outliers. Additionally or alternatively, a motion function can be fit to the transformation for smoothing purposes.

Using the estimated 3D transformation, the plurality of 3D patches can be registered (608) (e.g., by the patch registration module 108) thereby giving rise to a composite 3D point cloud of the vehicle. The registration is also illustrated as 707 in FIG. 7. During the registration, each 3D patch can be transformed according to its calculated transformation, and when the 3D patches are all transformed and aligned one to another, a composite 3D point cloud is generated. In some embodiments, additional registration can be applied, seeking for finer registration. For instance, ICP Iterative Closest Point (ICP) algorithm (or variations thereof) can be used which attempts to iteratively minimize the differences between overlapping shapes of point-clouds.

The composite 3D point cloud can be usable for reconstructing a vehicle model of the vehicle for vehicle inspection. Light reflection comprised in at least some of the a plurality of sets of images can be eliminated from the reconstructed vehicle model, which is achieved at least by the estimation of transformation and registration of the patches as described above.

As compared to certain registration methods which simply fit a distance model between patches and try to perform shape matching between the point clouds, the present disclosure implements a tracking system which tracks specific selected mutual features extracted from the images so as to estimate the transformation rule to be applied on the 3D patches. This provides more accurate registration, and can be computationally more efficient than performing registration of all points in the 3D point clouds.

According to certain embodiments, once the composite 3D point cloud is obtained, a 3D mesh representative of the surface of the vehicle can be generated (610) (e.g., by the meshing module 110) based on the composite 3D point cloud. The 3D mesh can be generated by fitting a local surface (also termed as face) for each group of neighboring points (e.g., a triplet of neighboring points) in the composite 3D point cloud. In some cases, further filtration can be performed (as illustrated in 708 when referring to FIG. 7) because the composite point cloud may still be too noisy for performing good meshing. By way of example, for performing filtration, the whole point cloud can be clustered into different surfaces corresponding to, e.g., different sides of the vehicle. A surface function can be fit to each surface. Any points that do not correspond to this surface can be filtered. The different surface clusters can be combined back to the whole vehicle and statistical filtering can be applied for further smoothing the surfaces.

In some embodiments, the 3D point cloud can then be uniformly sampled to create even-spread of vertices (i.e., corner points or angular points) in the mesh. Using a meshing method such as a surface reconstruction method, a 3D mesh can be created from the sub-sampled vertices. In some cases, this mesh may be considered as a "low resolution mesh" (709) due to the small number of vertices comprised therein, but it is a close approximation of the vehicle mesh reconstruction. The composite 3D point cloud can then be refined with this low resolution mesh. Each point in the 3D point cloud looks for the nearest vertex in the mesh, and if the distance between the point and the nearest vertex is larger than a threshold, the point is assigned with t of the coordinates of the closest vertex of the mesh (710). Otherwise, the point is kept as is. Next, the point cloud can be once again sub-sampled uniformly, this time with a higher resolution, and the point cloud can be re-meshed into high resolution mesh (711). Surface smoothing techniques on the mesh are applied, giving rise to a 3D mesh of the whole vehicle. Up until this step, color information is still missing, but the geometry of the 3D mesh satisfies the vehicle surfaces.

Using the 3D transformation, virtual positions of the set of imaging devices at the plurality of time points can be estimated. Virtual positions are representative of adjusted positions of the imaging devices in accordance with the relative movement at the plurality of time points. For instance, the imaging device structure (e.g., positions and orientation) are tracked, and imaging device structure for each time point corresponding to respective segment and aligning with the 3D mesh can be obtained.

Optionally, a shading aware lighting model can be used for surface optimization and refinement of the vertices of the mesh. Optionally, using the extracted features from the images and the adjust positions of the whole sequence, the features can be projected into the 3D mesh and then back to the images to minimize the re-projection error and fix the camera adjustment parameters. This is not necessary, but it can yield more fine texturing of the mesh.

Color information of the vehicle can be projected (612) onto the 3D mesh. The color information can be determined based on the plurality of sets of images and the virtual positions of the set of imaging devices. By way of example, the colors of the faces can be calculated by projecting the images at the 3D mesh (712) based on the camera that "sees" the faces, and the color information can be determined (713), e.g., by the weighted (e.g., weights can be according to distance from the camera) mean of colors, excluding the saturated colors that are considered as "reflections":

$$\text{Color} = \frac{1}{n} \sum_{0}^{n} D_n I_{RGB}.$$

Thus a 3D model of the vehicle with color information can be created (714).

Requested virtual views/virtual cameras are entered (715) by a user or external parameters to a process that renders (716) synthetic images from the 3D model and saves them to a local or cloud storage. From the storage, the data is available to user interfacing software to present (717) to the user.

The 3D mesh and/or the 3D model with virtual views can be used for identifying anomalies on the vehicle, including any anomaly which can be indicative of potential damages and deterioration, such as, e.g., cracking, scrapes, bulges, cuts, snags, punctures, foreign objects, or other damage resulting from daily use, etc. Due to removal of light reflection in the 3D mesh and/or 3D model, anomalies which could not be discovered before, can now be revealed. In addition, exact positions of the anomalies on the vehicle can be located. Repeated anomalies, such as, e.g., same scratches detected from different images, can be identified and eliminated, thereby rendering better detection results.

FIGS. 8A-E is an example of reflection removal in accordance with certain embodiments of the presently disclosed subject matter.

In FIG. 8A there is a presentation of a captured image of a vehicle segment with a reflection (marked with a circle). FIG. 8B illustrates the 3D patch of point cloud corresponding to the image from FIG. 8A. It can be seen that the point cloud has a hole corresponding to the part of the vehicle where the reflection is located. In FIG. 8C there is a presentation of a captured image of a vehicle segment in which there is no reflection in the area that suffered from reflection in FIG. 8A (marked with a circle). This image is taken at a different time point by the same imaging device, thus is captured under a different illumination condition pertaining to a different relative position/perspective between the area and the imaging device. FIG. 8D illustrates the 3D patch of point cloud corresponding to the image from FIG. 8C. It can be seen that the area in the point cloud that used to have a hole as shown in FIG. 8B is filled up with 3D points. FIG. 8E shows a combination of both 3D patches of point cloud (from FIGS. 8B and 8D) which results in a composite 3D point cloud with no holes, thereby effectively removing the reflection.

FIGS. 9A-D illustrate an example of tracking and registration of 3D patches of point clouds in a time domain in accordance with certain embodiments of the presently disclosed subject matter.

Figure 9B:
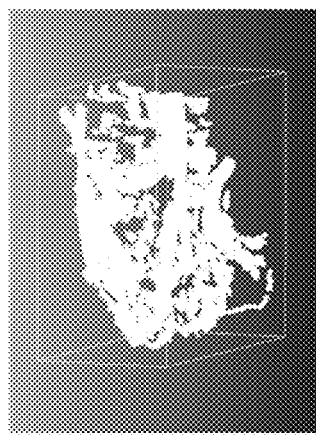
FIGS. 9A-D illustrate an example of tracking and registration of 3D patches of point clouds in a time domain in accordance with certain embodiments of the presently disclosed subject matter.
Figure 9A:
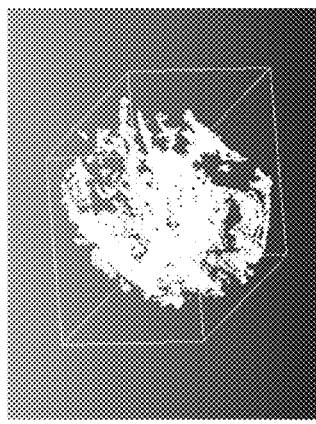
Figure 9C:
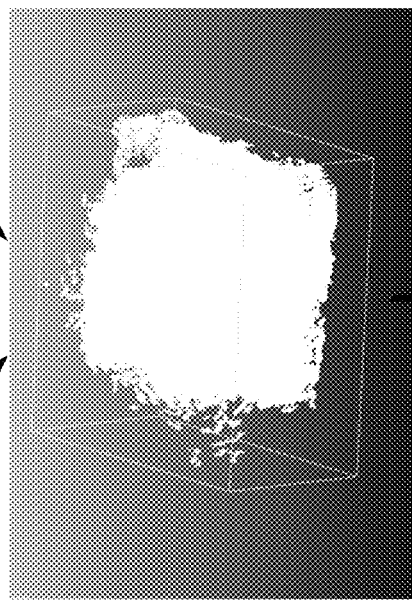
Figure 9D:
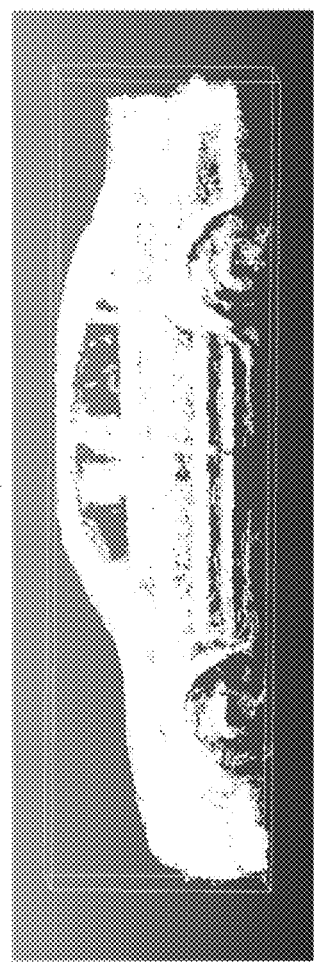

FIG. 9A is a presentation of 3D patch of point cloud bounded by the predetermined region (e.g., bounding box), taken in a certain time point (e.g., t=n). FIG. 9B is a presentation of 3D patch of point cloud bounded by the predetermined region, taken at a certain time point (e.g., t=n+1) after the vehicle is further along the system. FIG. 9C shows a composite 3D point cloud generated in time bounded by the predetermined region based on the 3D patches. In FIG. 9D, the predetermined region constraint is removed, and the point cloud patches are registered by estimating 3D transformation to accomplish a composite 3D point cloud of the entire vehicle.

Figure 10:
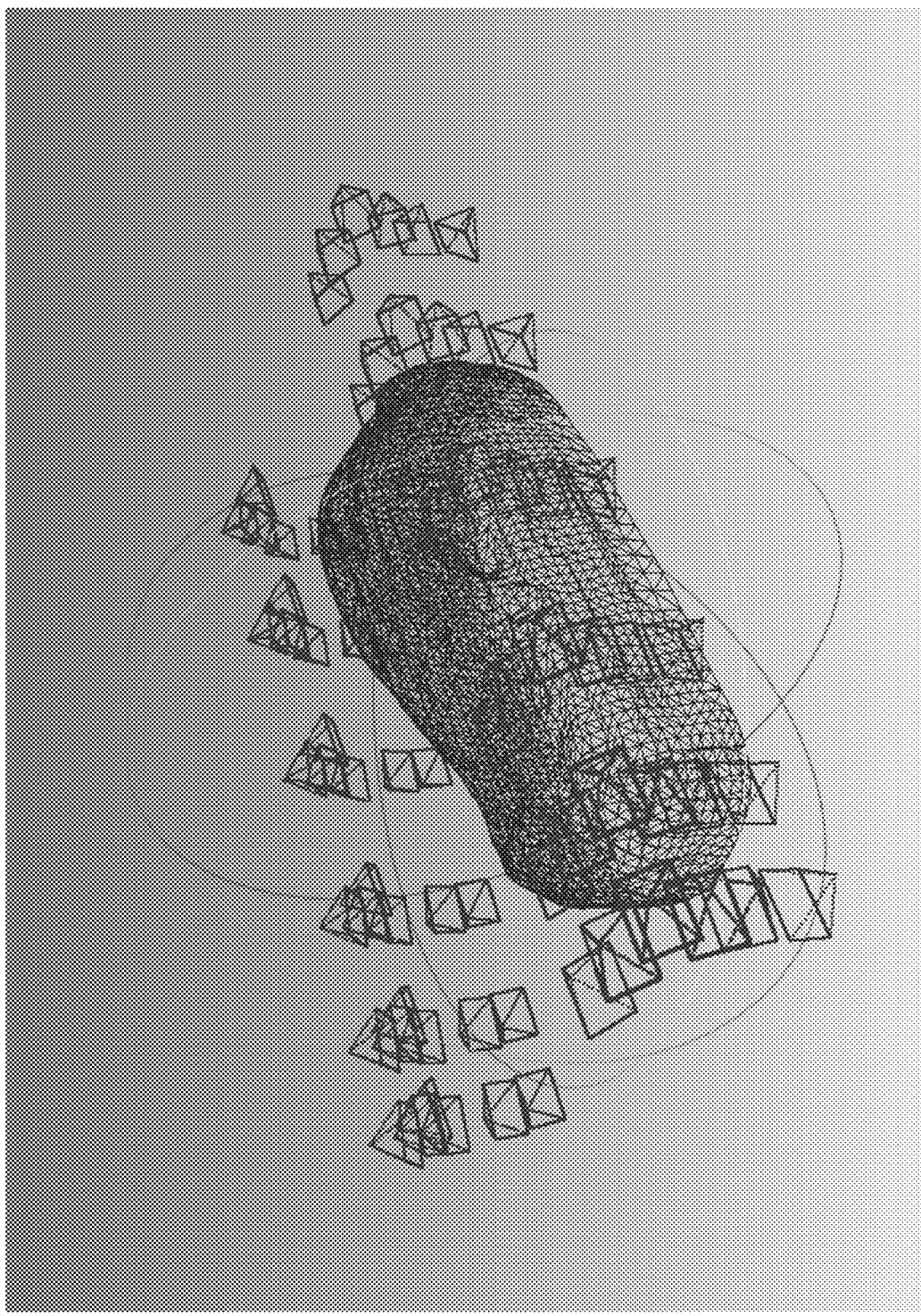
FIG. 10 illustrates a 3D mesh generated for the vehicle with representation of the tracked cameras in each time stamp in accordance with certain embodiments of the presently disclosed subject matter.

FIG. 10 illustrates a 3D mesh generated for the vehicle with representation of the tracked cameras in each time stamp in accordance with certain embodiments of the presently disclosed subject matter.

As described previously, certain embodiments of the present disclosure make a reverse assumption of moving cameras instead of a moving vehicle, which enables tracking of the cameras (for instance, camera structure, such as, e.g., positions and orientation, for each time point corresponding to respective segment and aligning with the 3D mesh are tracked) and estimating the transformation so as to register all 3D patches together. Virtual positions of the set of imaging devices at the plurality of time points are illustrated in FIG. 10, which are estimated using the 3D transformation.

Figure 11B:
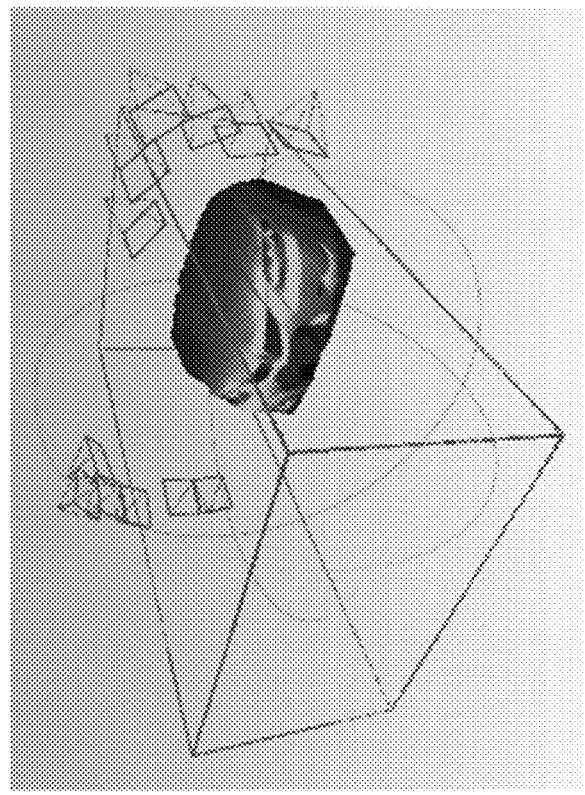
FIG. 11B illustrates a meshed and colored 3D patch in accordance with certain embodiments of the presently disclosed subject matter.
Figure 11A:
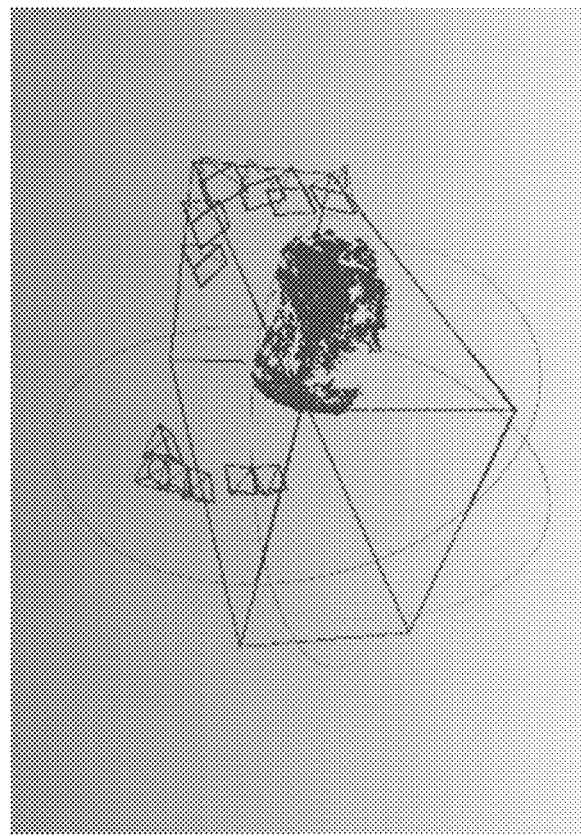
FIG. 11A illustrates an example of a reconstructed 3D patch relative to the bounding box and the cameras in the virtual 3D coordinate system in accordance with certain embodiments of the presently disclosed subject matter.

For purpose of illustration, FIG. 11A illustrates an example of a reconstructed 3D patch relative to the bounding box and the cameras in the virtual 3D coordinate system, and FIG. 11B illustrates a meshed and colored 3D patch in accordance with certain embodiments of the presently disclosed subject matter.

Figure 12:
FIG. 12 illustrates five different examples of synthetic vehicle images generated from virtual views in accordance with certain embodiments of the presently disclosed subject matter.

FIG. 12 illustrates five different examples of synthetic vehicle images generated from virtual views in accordance with certain embodiments of the presently disclosed subject matter. These synthetic images are generated in accordance with the reconstructed 3D model as if they are taken from perspectives different from where the imaging devices are actually located.

It is appreciated that the examples and embodiments illustrated with reference to the structure, positioning and configuration of the inspection system and the image processing in the present description are by no means inclusive of all possible alternatives but are intended to illustrate non-limiting examples only.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer readable memory or storage medium tangibly embodying a program of instructions executable by the computer for executing the method of the invention.

The non-transitory computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the invention as hereinbefore described without departing from its scope, defined in and by the appended claims.

The invention claimed is:

1. A computerized method of vehicle inspection, comprising:

obtaining, from a set of multiple imaging devices, a plurality of sets of multiple images capturing a plurality of segments of surface of a vehicle, wherein the set of multiple imaging devices are positioned on at least one side of an inspection passage that the vehicle passes by and are orientated to cover a Field of View (FOV) corresponding to a predetermined region, and the plurality of sets of multiple images are captured at a plurality of time points during a relative movement between the vehicle and the set of multiple imaging devices, such that: i) each set of multiple images captures a respective segment that falls within the predetermined region at a respective time point, and ii) the plurality of segments captured in the plurality of sets of multiple images are partially overlapped to such a way that each given surface point of at least some of the plurality of segments is captured at least at two time points in at least two sets of multiple images, the given surface point captured in the at least two sets of multiple images are as if captured under different illumination conditions pertaining to different relative positions between the given surface point and the set of multiple imaging devices at the two time points;

generating, for each given time point, a 3D patch using a set of multiple images capturing a corresponding segment at the given time point, the 3D patch comprising a point cloud of 3D points representative of corresponding surface points in the corresponding segment, giving rise to a plurality of 3D patches corresponding to the plurality of time points and the plurality of segments;

estimating 3D transformation of the plurality of 3D patches based on the relative movement between the set of multiple imaging devices and the vehicle at the plurality of time points; and registering the plurality of 3D patches using the estimated 3D transformation thereby giving rise to a composite 3D point cloud of the vehicle; wherein the composite 3D point cloud is usable for reconstructing a 3D mesh and/or 3D model of the vehicle where light reflection comprised in at least some of the plurality of sets of multiple images is eliminated therefrom; the 3D mesh and/or 3D model being usable for vehicle inspection;

wherein the estimating comprises:

extracting features characterizing the vehicle from each of the plurality of sets of multiple images;

estimating a local 3D transformation between each selected pair of two sets of multiple images that are overlapped and captured at two corresponding time points, comprising:

performing feature matching between features extracted from different images within each set of the two sets of multiple images and between corresponding images from the two sets to obtain respective sets of matched features;

selecting mutual features among the respective sets of snatched features;

triangulating the mutual features within each set of multiple images, giving rise to a pair of 3D feature sets representing the mutual features in the two sets of multiple images; and estimating a local 3D transformation between the two sets of multiple images by tracking movement between the pair of 3D feature sets; and aggregating the local 3D transformation to 3D transformation during the plurality of time points.

2. The computerized method of claim 1, wherein in said i), at the respective time point, each surface point of the respective segment is captured by at least two imaging devices of the set of multiple imaging devices.

3. The computerized method of claim 1, wherein the generating comprises:

extracting features characterizing the vehicle from each image of the set of multiple images;

performing feature matching between features extracted from different images in the set to obtain matched features; and triangulating the matched features to obtain 3D points representative of the matched features, the 3D points constituting a 3D patch.

4. The computerized method of claim 3, further comprising filtering outliers from the 3D patch based on one or more of the following filtering mechanisms: boundary of the predetermined region, depth smoothing algorithm, connected component analysis, and foreground and background classification.

5. The computerized method of claim 1, further comprising generating a 3D mesh representative of the surface of the vehicle based on the composite 3D point cloud, the 3D mesh generated by fitting a local surface for each group of neighboring points in the composite 3D point cloud.

6. The computerized method of claim 5, further comprising filtering the composite 3D point cloud using a surface function, wherein the 3D mesh is generated based on the filtered composite 3D point cloud.

7. The computerized method of claim 5, further comprising:

estimating virtual positions of the set of multiple imaging devices at the plurality of time points based on the 3D transformation, the virtual positions representative of adjusted positions of the imaging devices in accordance with the relative movement at the plurality of time points; and projecting color information of the vehicle on the 3D mesh, the color information determined based on the plurality of sets of multiple images and the virtual positions of the set of multiple imaging devices, giving rise to a 3D model of the vehicle.

8. The computerized method of claim 7, further comprising rendering one or more virtual views of the vehicle using the 3D model of the vehicle, wherein the 3D mesh and/or the 3D model and/or the one or more virtual views are usable for identifying anomalies on the surface of the vehicle.

9. A computerized vehicle inspection system the system comprising a processor and memory circuitry (PMC) configured to:

obtain, from a set of multiple imaging devices, a plurality of sets of multiple images capturing a plurality of segments of surface of a vehicle, wherein the set of multiple imaging devices are positioned on at least one side of an inspection passage that the vehicle passes by and are orientated to cover a Field of View (FOV) corresponding to a predetermined region, and the plurality of sets of multiple images are captured at a plurality of time points during a relative movement between the vehicle and the set of multiple imaging devices, such that: each set of multiple images captures a respective segment that falls within the predetermined region at a respective time point, and ii) the plurality of segments captured in the plurality of sets of multiple images are partially overlapped in such a way that each given surface point of at least some of the plurality of segments is captured at least at two time points in at least two sets of multiple images, the given surface point captured in the at least two sets of multiple images are as if captured under different illumination conditions pertaining to different relative positions between the given surface point and the set of multiple imaging devices at the two time points;

generate, for each given time point, a 3D patch using a set of multiple images capturing a corresponding segment at the given time point, the 3D patch comprising a point cloud of 3D points representative of corresponding surface points in the corresponding segment, giving rise to a plurality of 3D patches corresponding to the plurality of time points and the plurality of segments;

estimate 3D transformation of the plurality of 3D patches based on the relative movement between the set of multiple imaging devices and the vehicle at the plurality of time points; and register the plurality of 3D patches using the estimated 3D transformation thereby giving rise to a composite 3D point cloud of the vehicle, wherein the composite 3D point cloud is usable for reconstructing a 3D mesh and/or 3D model of the vehicle where light reflection comprised in at least some of the plurality of sets of multiple images is eliminated therefrom, the 3D mesh and/or 3D model being usable for vehicle inspection;

wherein the PMC is configured to estimate the 3D transformation by:

extracting features characterizing the vehicle from each of the plurality of sets of multiple images;

estimating a local 3D transformation between each selected pair of two sets of multiple images that are overlapped and captured at two corresponding time points, comprising:

performing feature matching between features extracted from different images within each set of the two sets of multiple images and between corresponding images from the two sets to obtain respective sets of matched features;

selecting mutual features among the respective sets of matched features;

triangulating the mutual features within each set of multiple images, giving rise to a pair of 3D feature sets representing the mutual features in the two sets of multiple images; and estimating a local 3D transformation between the two sets of multiple images by tracking movement between the pair of 3D feature sets; and aggregating the local 3D transformation to 3D transformation during the plurality of time points.

10. The computerized vehicle inspection system of claim 9, wherein in said i), at the respective time point, each surface point of the respective segment is captured by at least two imaging devices of the set of multiple imaging devices.

11. The computerized vehicle inspection system of claim 9, wherein the PMC is configured to generate a 3D patch by:

extracting features characterizing the vehicle from each image of the set of multiple images;

performing feature matching between features extracted from different images in the set to obtain matched features; and triangulating the matched features to obtain 3D points representative of the matched features, the 3D points constituting a 3D patch.

12. The computerized vehicle inspection system of claim 11, wherein the PMC is further configured to filter outliers from the 3D patch based on one or more of the following filtering mechanisms: boundary of the predetermined region, depth smoothing algorithm, connected component analysis, and foreground and background classification.

13. The computerized vehicle inspection system claim 9, wherein the PMC is further configured to generate a 3D mesh representative of the surface of the vehicle based on the composite 3D point cloud, the 3D mesh generated by fitting a local surface for each group of neighboring points in the composite 3D point cloud.

14. The computerized vehicle inspection system of claim 13, wherein the PMC is further configured to filter the composite 3D point cloud using a surface function, wherein the 3D mesh is generated based on the filtered composite 3D point cloud.

15. The computerized vehicle inspection system of claim 13, wherein the PMC is further configured to:
   estimate virtual positions of the set of multiple imaging devices at the plurality of time points based on the 3D transformation, the virtual positions representative of adjusted positions of the imaging devices in accordance with the relative movement at the plurality of time points; and
   project color information of the vehicle on the 3D mesh, the color information determined based on the plurality of sets of multiple images and the virtual positions of the set of multiple imaging devices, giving rise a 3D model of the vehicle.

16. The computerized vehicle inspection system of claim 15, wherein the PMC is further configured to render one or more virtual views of the vehicle using the 3D model of the vehicle, wherein the 3D mesh and/or the 3D model and/or the one or more virtual views are usable for identifying anomalies on the surface of the vehicle.

17. The computerized vehicle inspection system of claim 9, further comprising the set of multiple imaging devices which are attached to a supporting structure comprising at least one pole positioned on the at least one side of an inspection passage.

18. The computerized vehicle inspection system of claim 17, further comprising the supporting structure, wherein the set of multiple imaging devices are attached to the supporting structure at different heights and orientated in such a way that at a respective time point, each surface point of the respective segment is captured by at least two imaging devices of the set of multiple imaging devices.

19. The computerized vehicle inspection system of claim 18, wherein an angle between two neighboring imaging devices and the vehicle is less than 60 degrees.

20. The computerized vehicle inspection system of claim 9, wherein the predetermined region is determined according to vehicle dimensions.

21. The computerized vehicle inspection system of claim 9, wherein the number of imaging devices in the set is determined according to a predetermined accuracy requirement.

22. The computerized vehicle inspection system of claim 9, wherein multiple sets of multiple imaging devices are attached to the supporting structure, each set faces a respective direction, and the number of sets of multiple imaging devices and/or the number of imaging devices in each set is determined according to a predetermined accuracy requirement.

23. The computerized vehicle inspection system f claim 9, further comprising an undercarriage inspection unit embedded underground of the inspection passage and configured to capture one or more images of undercarriage of the vehicle when the vehicle passes by.

24. The computerized vehicle inspection system of claim 9, further comprising one or more illumination units positioned on the at least one side of the inspection passage for providing illumination covering the predetermined region.

25. The computerized vehicle inspection system of claim 17, wherein the vehicle is a moving vehicle and the supporting structure is mounted on the ground so that the vehicle is moving on the inspection passage relative to the supporting structure.

26. The computerized vehicle inspection system of claim 17, wherein the vehicle is a static vehicle wherein the supporting structure is mounted on a movable platform so as to move relative to the vehicle.

27. A non-transitory computer readable medium comprising instructions that, when executed by a computer, cause the computer to perform a method of vehicle inspection, the method comprising:
   obtaining, from a set of multiple imaging devices, a plurality of sets of multiple images capturing a plurality of segments of surface of a vehicle, wherein the set of multiple imaging devices are positioned on at least one side of an inspection passage that the vehicle passes by and are orientated to cover a Field of View (FOV) corresponding to a predetermined region, and the plurality of sets of multiple images are captured at a plurality of time points during a relative movement between the vehicle and the set of multiple imaging devices, such that: i) each set of multiple images captures a respective segment that falls within the predetermined region at a respective time point, and ii) the plurality of segments captured in the plurality of sets of multiple images are partially overlapped in such a way that each given surface point of at least some of the plurality of segments is captured at least at two time points in at least two sets multiple images, the given surface point captured in the at least two sets of multiple images are as if captured under different illumination conditions pertaining to different relative positions between the given surface point and the set of multiple imaging devices at the two time points;
   generating, for each given time point a 3D patch using a set of multiple images capturing a corresponding segment at the given time point, the 3D patch comprising a point cloud of 3D points representative of corresponding surface points in the corresponding segment, giving rise to a plurality of 3D patches corresponding to the plurality of time points and the plurality of segments;
   estimating 3D transformation of the plurality of 3D patches based on the relative movement between the set of multiple imaging devices and the vehicle at the plurality of time points; and
   registering the plurality of 3D patches using the estimated 3D transformation thereby giving rise to a composite 3D point cloud of the vehicle, wherein the composite 3D point cloud is usable for reconstructing a 3D mesh and/or 3D model of the vehicle where light reflection comprised in at least some of the plurality of sets of multiple images is eliminated therefrom, the 3D mesh and/or 3D model being usable for vehicle inspection:

wherein the estimating comprises:

extracting features characterizing the vehicle from each of the plurality of sets of multiple images;

estimating a local 3D transformation between each selected pair of two sets of multiple images that are overlapped and captured at two corresponding time points, comprising:

performing feature matching between features extracted from different images within each set of the two sets of multiple images and between corresponding images from the two sets to obtain respective sets of matched features;

selecting mutual features among the respective sets of matched features;

triangulating the mutual features within each set of multiple images, giving rise to a pair of 3D feature sets representing the mutual features in the two sets of multiple images; and estimating a local 3D transformation between the two sets of multiple images by tracking movement between the pair of 3D feature sets; and aggregating the local 3D transformation to 3D transformation during the plurality of time points.

* * * * *

UNITED STATES PATENT AND TRADEMARK OFFICE
CERTIFICATE OF CORRECTION

PATENT NO. : 11,301,981 B2
APPLICATION NO. : 17/041586
DATED : April 12, 2022
INVENTOR(S) : Hever et al.

Page 1 of 1

It is certified that error appears in the above-identified patent and that said Letters Patent is hereby corrected as shown below:

In the Claims

In Claim 1, Column 22, Line 21, please delete "overlapped to such a way" and add "overlapped in such a way".

In Claim 1, Column 22, Line 44, please delete "3D point cloud of the vehicle;" and add "3D point cloud of the vehicle,".

In Claim 1, Column 22, Line 63, please delete "snatched features" and add "matched features".

In Claim 13, Column 25, Line 10, please delete "The computerized vehicle inspection claim 9" and add "The computerized vehicle inspection of claim 9".

In Claim 27, Column 26, Line 50, please delete "generating, for each given time point a 3D patch" and add "generating, for each given time point, a 3D patch".

Signed and Sealed this
Twenty-seventh Day of September, 2022

Katherine Kelly Vidal
*Director of the United States Patent and Trademark Office*